(12) United States Patent
Ferry et al.

(10) Patent No.: US 11,229,965 B2
(45) Date of Patent: *Jan. 25, 2022

(54) SYSTEM AND METHOD FOR AUTOMATED MACHINING OF TOOTHED MEMBERS

(71) Applicant: PRATT & WHITNEY CANADA CORP., Longueuil (CA)

(72) Inventors: William Ferry, Saint-Lambert (CA); Mario Blais, Varennes (CA); Yan Cousineau, Saint-Amable (CA)

(73) Assignee: PRATT & WHITNEY CANADA CORP.

( * ) Notice: Subject to any disclaimer, the term of this patent is extended or adjusted under 35 U.S.C. 154(b) by 10 days.

This patent is subject to a terminal disclaimer.

(21) Appl. No.: 16/834,071

(22) Filed: Mar. 30, 2020

(65) Prior Publication Data
US 2020/0223002 A1    Jul. 16, 2020

Related U.S. Application Data

(63) Continuation of application No. 14/573,899, filed on Dec. 17, 2014, now Pat. No. 10,639,734.

(51) Int. Cl.
*B23F 23/12* (2006.01)
*G05B 19/18* (2006.01)

(52) U.S. Cl.
CPC ........ *B23F 23/1225* (2013.01); *G05B 19/182* (2013.01); *G05B 2219/35035* (2013.01); *Y02P 90/02* (2015.11)

(58) Field of Classification Search
CPC .............. B23F 23/1225; G05B 19/182; G05B 2219/35035; Y02P 90/265
See application file for complete search history.

(56) References Cited

U.S. PATENT DOCUMENTS

| | | |
|---|---|---|
| 3,640,030 A | 2/1972 | Clarke et al. |
| 3,731,433 A | 5/1973 | Clarke et al. |
| 4,045,920 A | 9/1977 | Fukuma et al. |
| 4,213,277 A | 7/1980 | Fivian |
| 4,531,294 A | 7/1985 | Lenz |
| 4,640,057 A | 2/1987 | Salje |

(Continued)

OTHER PUBLICATIONS

Gleason "Curvic Coupling Design", The Gleason Works, Rochester, New York, SD 3116D, Jun. 1973, 26 pages.

*Primary Examiner* — Chad G Erdman
(74) *Attorney, Agent, or Firm* — Norton Rose Fulbright Canada LLP

(57) ABSTRACT

A method for machining a workpiece to provide a toothed member having a desired tooth pattern. The workpiece is machined to a first depth using a cutting tool, thereby forming a semi-finished tooth pattern, the first depth less than a full depth to which the workpiece is to be machined to provide the desired tooth pattern. Dimensions of the semi-finished tooth pattern are acquired and compared to nominal dimensions. If the acquired dimensions are not within a tolerance of the nominal dimensions, the geometry of the cutting tool is modified for correcting deviations of the acquired dimensions from tolerance and the workpiece further machined by the modified cutting tool. Once the dimensions of the semi-finished tooth pattern are within tolerance, the workpiece is machined to the full depth for providing the desired tooth pattern.

11 Claims, 18 Drawing Sheets

(56) References Cited

U.S. PATENT DOCUMENTS

| | | | |
|---|---|---|---|
| 4,819,515 A * | 4/1989 | Pfaltzgraff | B23D 63/005 |
| | | | 451/17 |
| 5,060,164 A | 10/1991 | Yoneda et al. | |
| 5,297,055 A | 3/1994 | Johnstone | |
| 5,674,106 A | 10/1997 | Cheetham | |
| 5,928,065 A | 7/1999 | Shih | |
| 6,341,999 B1 | 1/2002 | Ohmori et al. | |
| 7,974,730 B2 | 7/2011 | Durr | |
| 2001/0017169 A1 * | 8/2001 | Englert | G05B 19/4093 |
| | | | 144/116 |
| 2001/0031609 A1 | 10/2001 | Takenoshita et al. | |
| 2002/0197122 A1 | 12/2002 | Mizutani et al. | |
| 2008/0206060 A1 * | 8/2008 | Roberts | B23H 9/10 |
| | | | 416/219 R |
| 2008/0213056 A1 * | 9/2008 | Katoh | B23B 41/02 |
| | | | 409/136 |
| 2010/0242283 A1 * | 9/2010 | Thompson | B23F 19/06 |
| | | | 29/893.3 |
| 2012/0252318 A1 | 10/2012 | Yanase et al. | |
| 2014/0067321 A1 | 3/2014 | Zinngrebe | |
| 2014/0373377 A1 | 12/2014 | Nakagawa et al. | |
| 2015/0011142 A1 | 1/2015 | Breith et al. | |
| 2015/0053526 A1 | 2/2015 | Brathwaite et al. | |
| 2015/0098769 A1 | 4/2015 | Munigala | |

\* cited by examiner

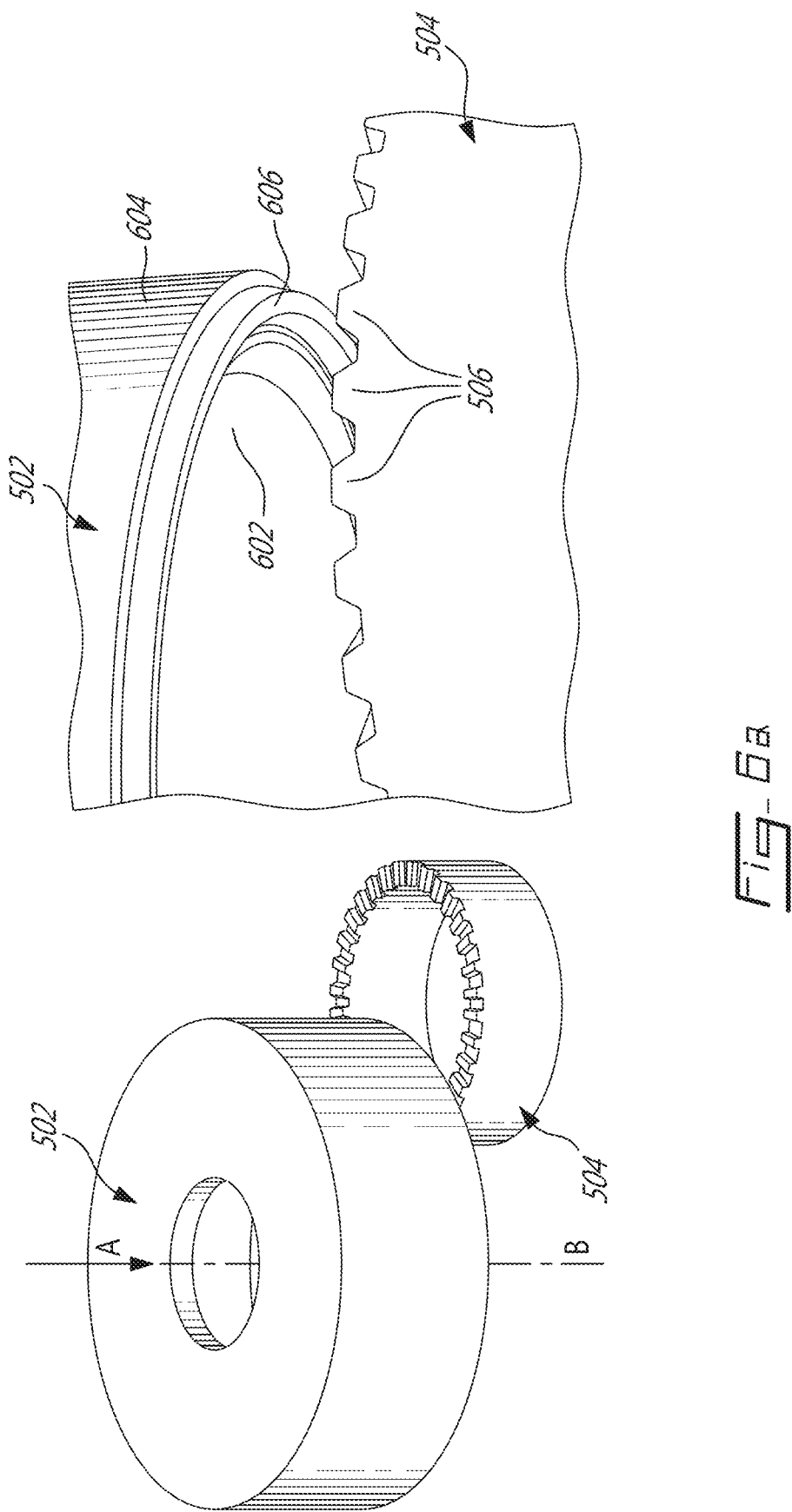

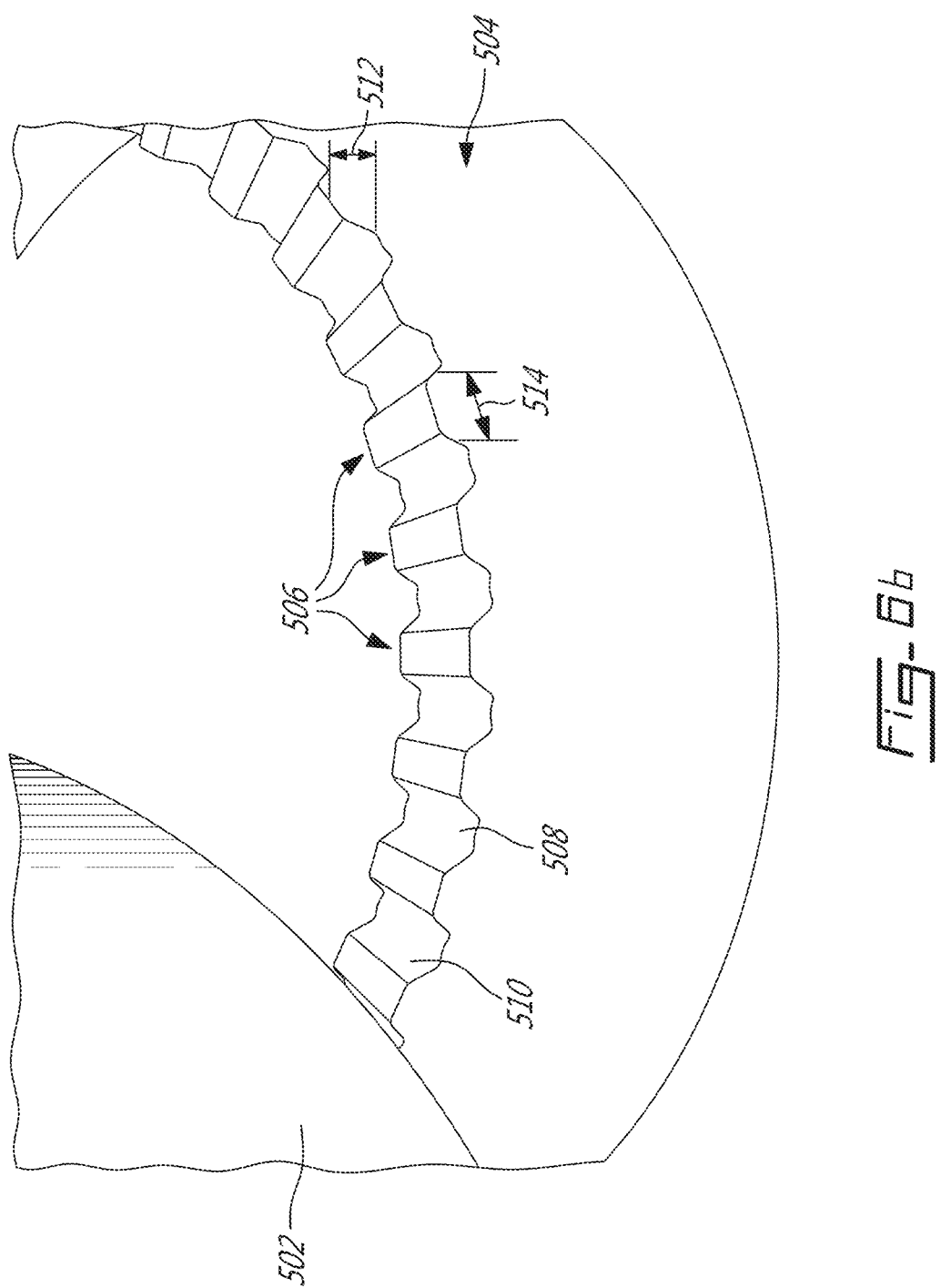

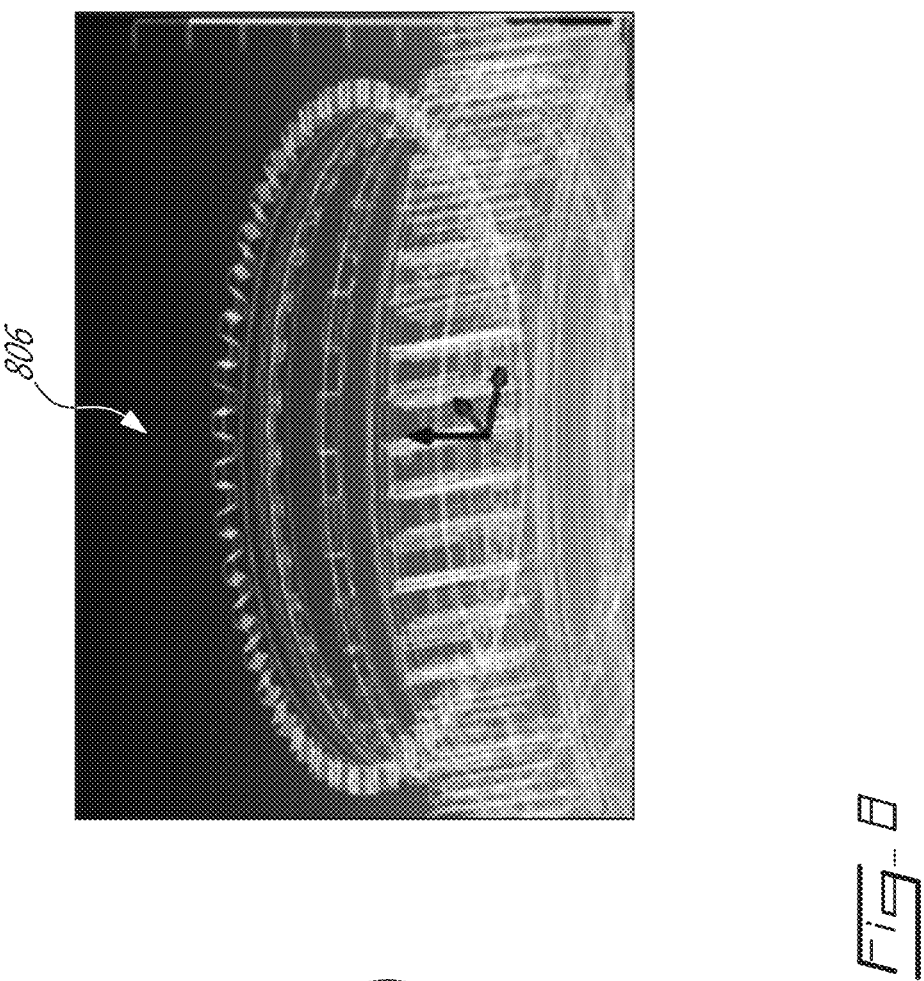
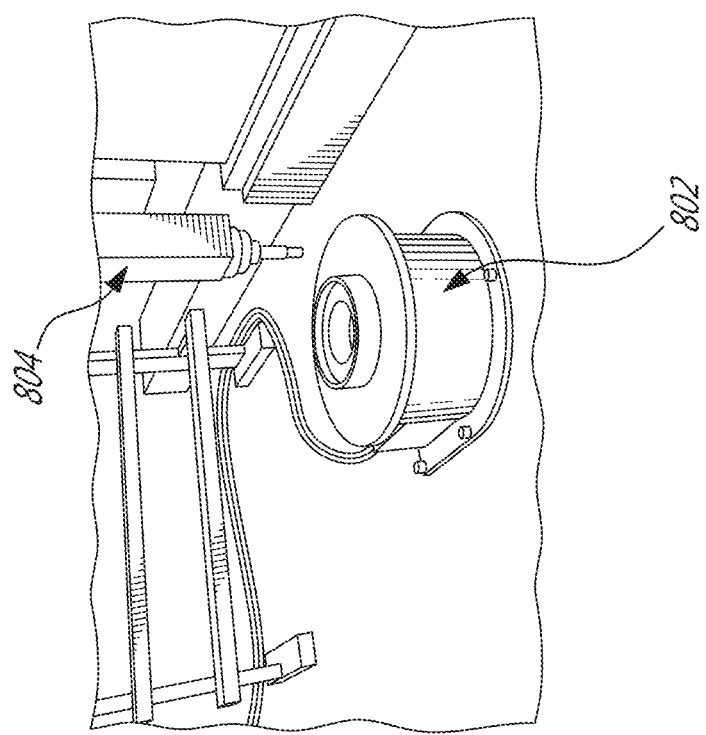
Fig. 8

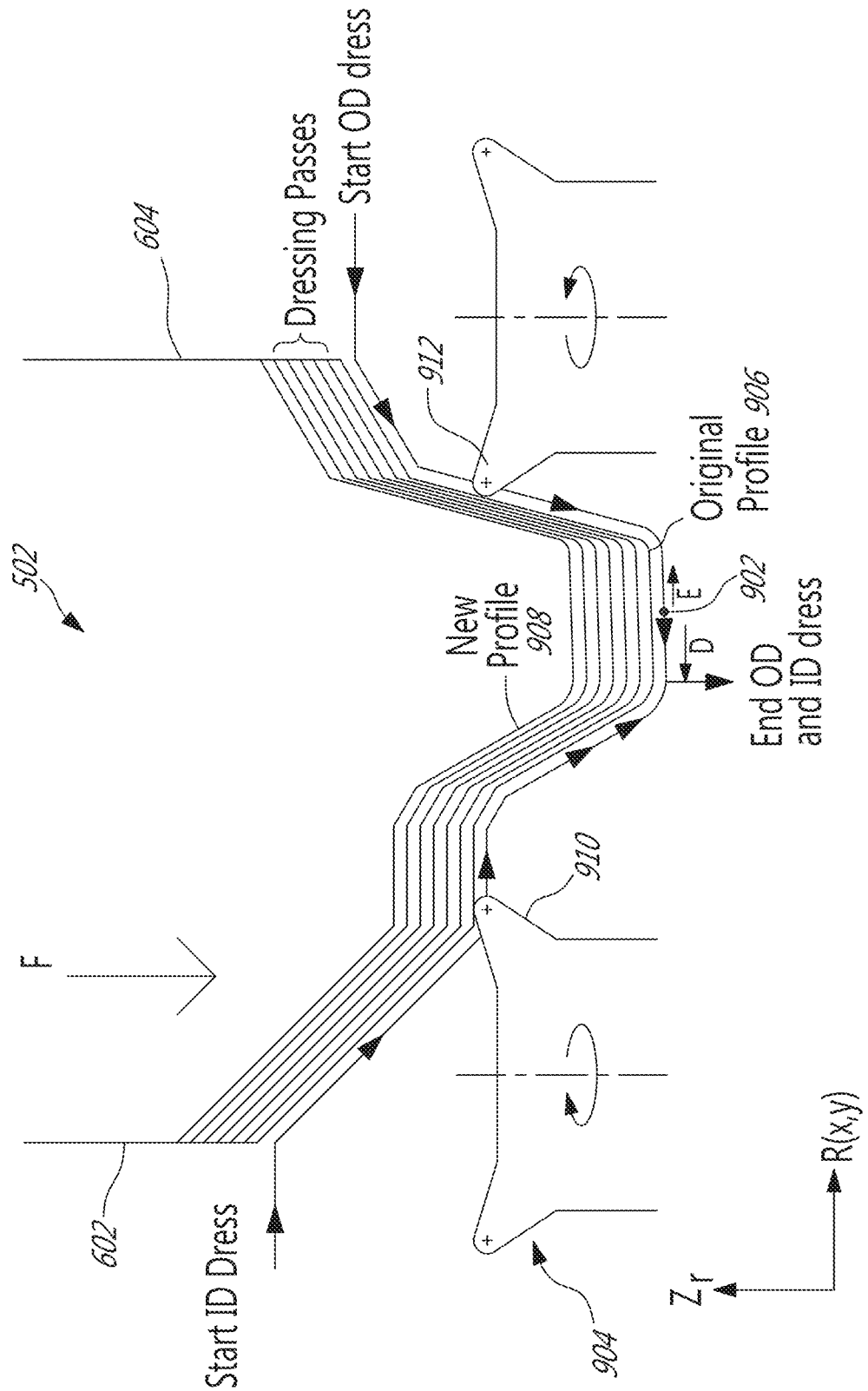

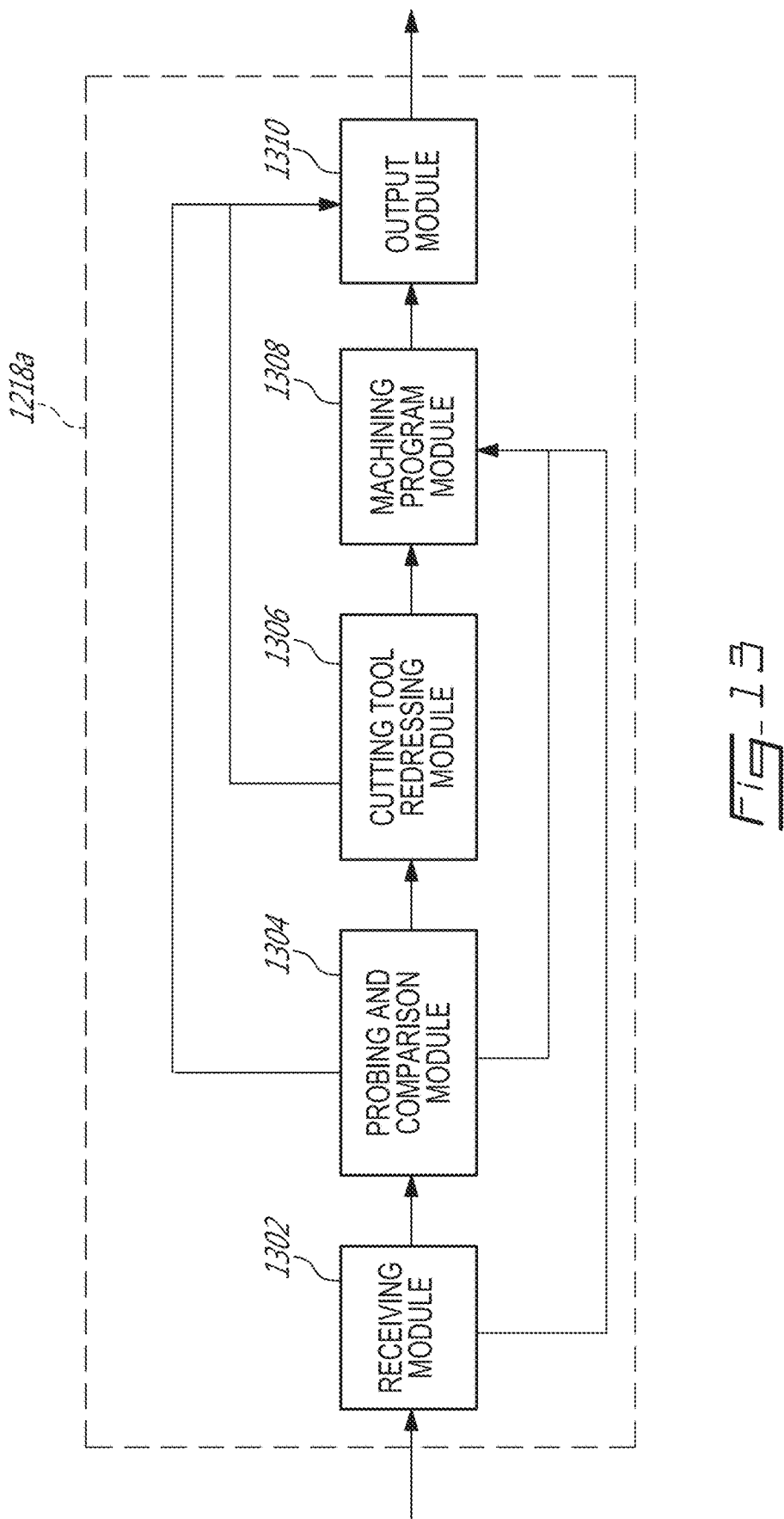

SYSTEM AND METHOD FOR AUTOMATED MACHINING OF TOOTHED MEMBERS

CROSS-REFERENCE TO RELATED APPLICATIONS

The present application is a Continuation of U.S. patent application Ser. No. 14/573,899 filed on Dec. 17, 2014, the contents of which are hereby incorporated by reference.

TECHNICAL FIELD

The disclosure relates generally to automated machining of parts and, more particularly, toothed members.

BACKGROUND OF THE ART

Toothed members, such as curvic couplings, are commonly found in gas turbine engines as they provide connection between engine parts and permit highly precise centering and stacking of engine parts. Given the tight tolerances required for aerospace applications, such toothed members have to be machined with great accuracy in order to ensure proper functioning in the engine. Therefore, machine tool operators are typically required to make several manual interventions during the machining process in order to ensure that parameters (e.g. concentricity, perpendicularity, addendum, pitch plane height, contact pattern) associated with a freshly machined toothed member are within required specifications.

In particular, as part of the conventional manufacturing process, an operator is typically required to use a master gauge, depth micrometer, and height gauge at various stages of the machining process to ensure that the dimensions of the freshly machined part are within tolerance. Given the complexity of the manufacturing process, a substantial amount of manual measurement and setup operations is required, which proves time consuming and costly.

There is therefore a need for improved systems and methods for manufacturing parts, such as toothed members, that are subject to tight tolerances.

SUMMARY

In one aspect, there is provided a method for machining from a workpiece a toothed member with a desired tooth pattern. The method comprises machining the workpiece to a predetermined partial depth using a cutting tool to provide a semi-finished tooth pattern created according to a geometry of the cutting tool, the predetermined partial depth less than a full depth of the desired tooth pattern; comparing computed parameters of the semi-finished tooth pattern based on dimensions of the semi-finished tooth pattern to nominal parameters of the semi-finished tooth pattern and determining whether the computed parameters are within a predetermined tolerance of the nominal dimensions for the semi-finished tooth pattern at the predetermined partial depth; modifying the geometry of the cutting tool to correct deviations of the computed parameters from the tolerance when the computed parameters are not within the predetermined tolerance of the nominal dimensions, and machining the workpiece with the modified cutting tool to bring the dimensions of the semi-finished tooth pattern within the tolerance for the semi-finished tooth pattern at the predetermined partial depth; and machining the workpiece to the full depth to provide the desired tooth pattern when the dimensions of the semi-finished tooth pattern are within the tolerance for the semi-finished tooth pattern at the predetermined partial depth.

DESCRIPTION OF THE DRAWINGS

Reference is now made to the accompanying figures in which:

FIG. 6a is a perspective view of a cutting tool machining a workpiece, in accordance with an illustrative embodiment;

FIG. 6b is a perspective view of the workpiece of FIG. 6a being machined to form a toothed member;

FIG. 8 illustrates a master gauge under analysis on a scanning coordinate measuring machine (CMM) and reconstructed surfaces of the master gauge teeth from the CMM inspection, in accordance with one embodiment;

FIG. 9 is a schematic diagram showing dressing of a cutting tool, in accordance with one embodiment;

FIG. 13 is a schematic diagram of an application running on the processor of FIG. 12.

DETAILED DESCRIPTION

Figure 1:
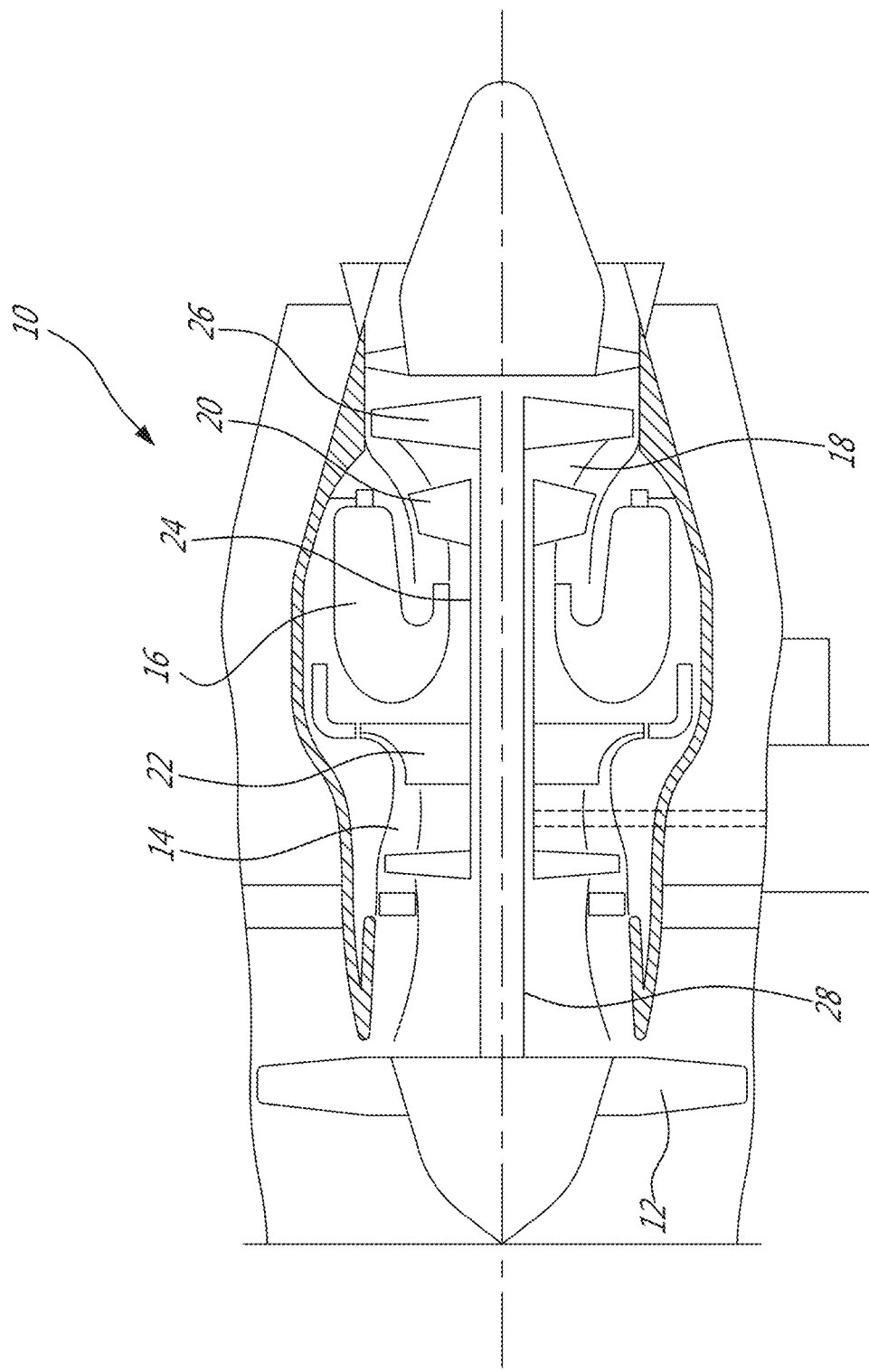
FIG. 1 is a schematic cross-sectional view of a gas turbine engine.

FIG. 1 illustrates a gas turbine engine 10 of a type preferably provided for use in subsonic flight, generally comprising in serial flow communication a fan 12 through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases. High pressure rotor(s) 20 of the turbine section 18 are drivingly engaged to high pressure rotor(s) 22 of the compressor section 14 through a high pressure shaft 24. Low pressure rotor(s) 26 of the turbine section 18 are drivingly engaged to the fan rotor 12 and to other low pressure rotor(s) (not shown) of the compressor section 14 through a low pressure shaft 28 extending within the high pressure shaft 24 and rotating independently therefrom.

The engine 10 illustratively comprises various parts, such as toothed members, that are to be machined with tight tolerances. The parts may be machined using multi-axis Numerical Control (NC) (e.g. Computer Numerical Control (CNC)) machining centers. A cutting tool provided on the NC machine may be used to perform the machining operation. In one embodiment, the machining operation comprises a grinding process, e.g. plunge grinding, and the cutting tool is a grinding wheel (e.g. cup-shaped). Still, it should be understood that other suitable machining processes and accordingly other cutting tools, may apply.

Figure 2:
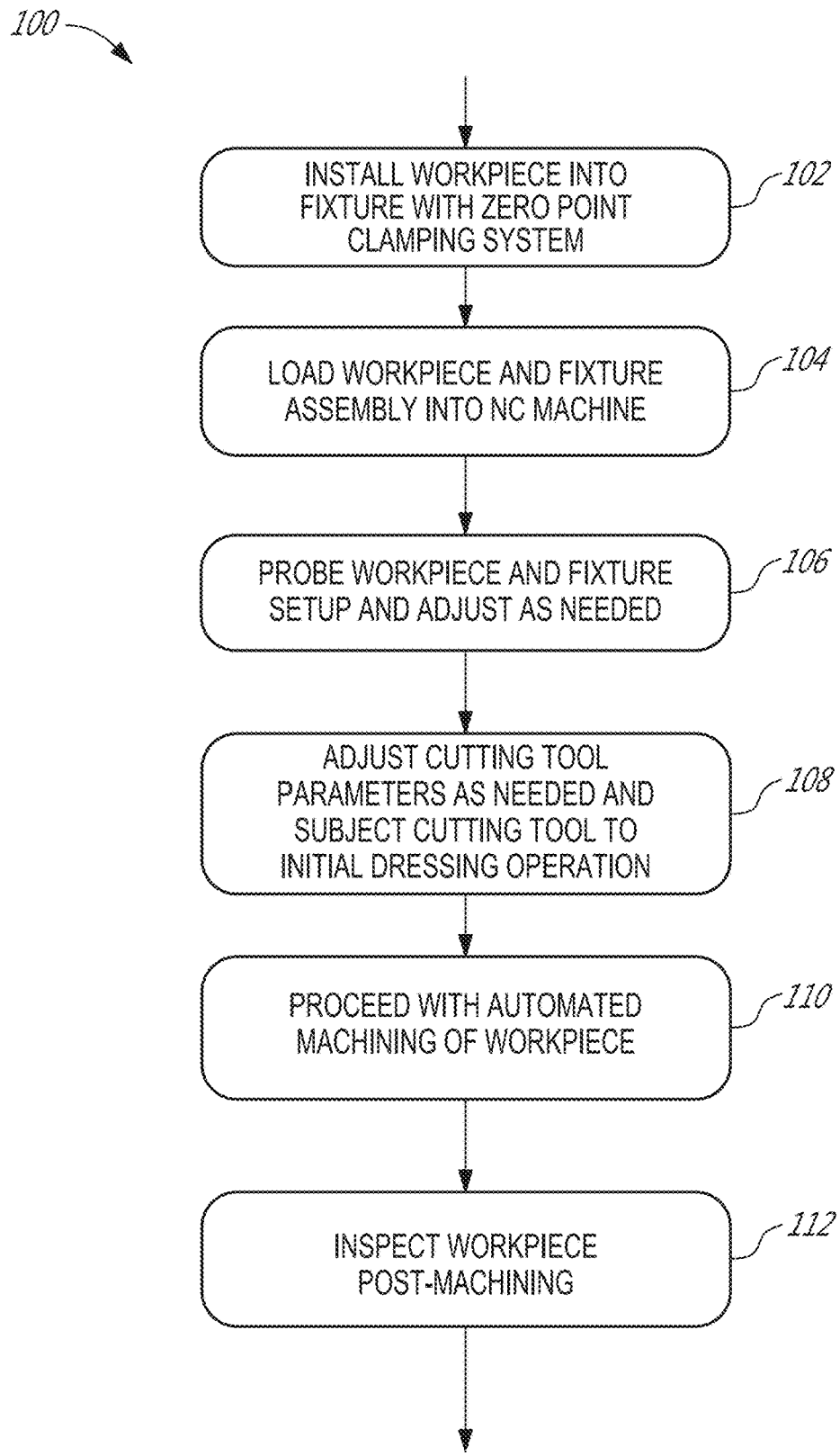
FIG. 2 is a flowchart of a method for manufacturing a toothed member, in accordance with an illustrative embodiment.

Referring to FIG. 2, a method 100 for manufacturing a toothed member will now be described. In one embodiment, the method 100 is used to manufacture a curvic coupling, i.e. a toothed connection member that can be used to transmit torque between rotating elements. Curvic couplings are commonly found in gas turbine engines, such as the engine 10 of FIG. 1, for several reasons. First, curvic couplings can be machined directly onto rotors such as axial and centrifugal compressors and turbine disks, eliminating the need for separate shafts. Rotors can then be stacked closely and accurately with minimal distance between mating parts. Second, curvic couplings permit highly precise centering of parts during disassembly and installation in an engine. In addition, curvic couplings are relatively quick to manufacture if a suitable machine and cutting tool are available. It should however be understood that, although the proposed system and method are presented herein as being used to manufacture curvic couplings, other toothed members, including, but not limited to, splines, gears (e.g. bevel gears and spur gears), couplings and slots, may apply.

A curvic coupling typically has teeth spaced circumferentially about its face, the teeth having a curved shape when viewed in a plane perpendicular to a central (or "coupling") axis of the curvic coupling and the two opposed sides of a given tooth in a curvic coupling being curved in opposite directions. Two mating curvic couplings are typically coupled to create a connection, with one curvic coupling being made with convex, or "barrel-shaped", teeth while its mate is made with concave, or "hour-glass-shaped", teeth. Curvic coupling teeth can be produced with a wide range of pressure angles to suit various applications. All teeth of a given curvic coupling are generally ground to a constant depth and a theoretical radius, which have to be accurate within prescribed tolerances in order to ensure proper engagement with mating curvic couplings.

The method 100 illustratively comprises installing at step 102 into a fixture, e.g. a fixture with a zero-point clamping system, a workpiece (e.g. an annular-shaped workpiece) to be machined to obtain a desired toothed member (e.g. curvic coupling or gear). It is desirable for locating face(s) on the workpiece and fixture to be manufactured such that tolerances on flatness for the workpiece and fixture are significantly below those of the finished toothed member obtained post-machining. The next step 104 is then to load the workpiece and fixture assembly into an NC machine (e.g. an NC grinding machine). This may be achieved using an automated loading/unloading system, such as a robot with a quick change zero-point clamping system. Alternatively, loading may be performed by an operator. In one embodiment, once the fixture is placed into a loading position on a work table of the NC machine, a signal will be sent by the NC machine to cause clamping or unclamping of the fixture into position on the work table.

Figure 3:
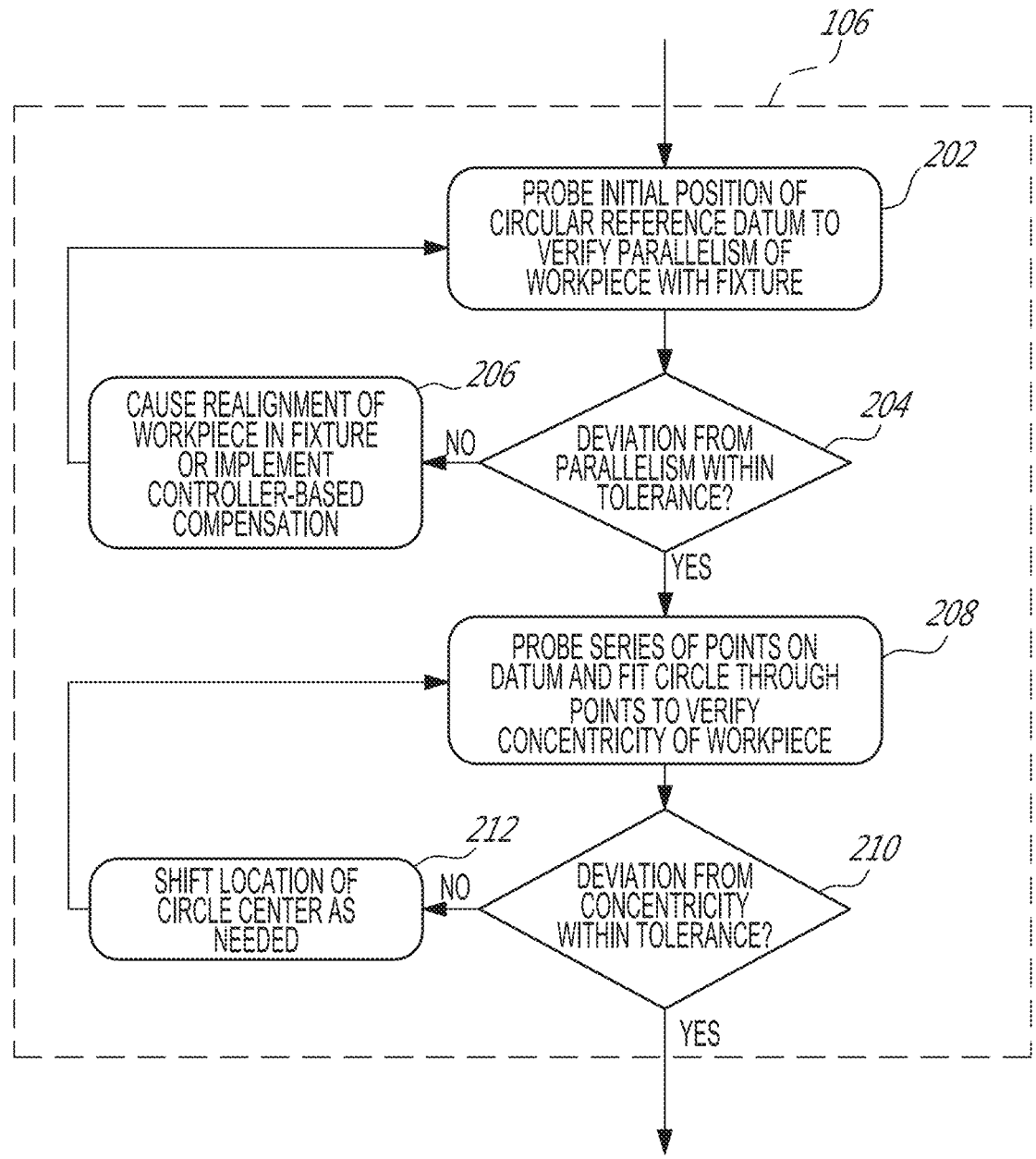
FIG. 3 is a flowchart of the step of FIG. 2 of probing and adjusting a workpiece and fixture setup.

The setup obtained at step 104 may then be probed and adjusted as needed at step 106. Referring to FIG. 3, the step 106 of probing and adjusting the workpiece and fixture setup illustratively comprises probing at step 202 the initial position of a circular reference datum to verify the parallelism of the workpiece with a locating face of the fixture. As used herein, the term "datum" refers to one or more reference points or surface(s) that measurements are taken from. The circular reference datum may have been predetermined and defined on the engineering drawings or manufacturing operation sheet. In one embodiment, the datum used for measuring parallelism is the face on the workpiece where the toothed member is ground. However, it should be understood that the datum could also be two or more diameter locations near the area of the annular-shaped toothed member. The probing may be performed at step 202 using a part probing system (e.g. a scanning or touch probing system) provided on (e.g. integrated with) the NC machine. In order to acquire measurements, a tip of a probe may be moved along a pre-programmed (e.g. NC programmed) probing direction toward positions on the workpiece where measurements are to be acquired. The probe may further be coupled to a force sensor (not shown), which acquires a measurement signal when the probe tip touches the surface of the workpiece. In one embodiment, the probing system is a strain-gage. It should be understood that other probing systems or measuring devices may apply. For example, a coordinate measuring machine (CMM) connected to the NC machining center may be used to acquire measurements on a surface of the workpiece.

A measure of the parallelism of the workpiece relative to the fixture may be obtained from the acquired measurements. This may be achieved by probing several points on the face of the workpiece where the toothed member is ground and computing the difference between the minimum and maximum height values (e.g. z-values). Alternatively, a plane may be fitted through a number of (e.g. three (3)) probed points and the height difference at the extremes of the plane (at the diameters of the toothed member area) may then be computed. Multiple points may also be probed and a plane calculated by a least-squares or regression plane fitting algorithm. In other embodiments, the measure of the parallelism may be obtained by finding the center of two or more diameter locations, one being at the toothed member face, and fitting a plane whose normal is a line connecting the two (or more) diameters. If the workpiece is not parallel with the fixture's locating face and a deviation is measured, the next step 204 may then be to assess whether the deviation from parallelism is within a predetermined tolerance. Tolerances referred to herein are illustratively defined by engineering drawings or manufacturing operation sheets. Typical values are between 0.0002 and 0.002 inches. If this is not the case, i.e. the deviation is beyond tolerance, the next step 206 may be to cause realignment of the workpiece by generate an alarm accordingly. Alternatively, the misalignment may be corrected at step 206 by implementing a controller-based compensation method, provided such an option is available on the NC machine and the latter has an appropriate number of axes for implementation of the compensation method. In one embodiment, at least five (5) axes are used for parallelism compensation, comprising three (3) linear axes and two (2) rotary axes. The method may then flow back to repeat steps 202 and 204.

When it is determined at step 204 that the deviation from parallelism is within tolerance, concentricity of the workpiece relative to a rotary axis of the NC machine's work table may then be checked. For this purpose, a series of points may be probed on the workpiece datum and a circle fitted through the points at step 208. A face is illustratively used as a datum to measure parallelism, as discussed above, while a diameter is used as a datum to measure concentricity. However, it should be understood that it is possible to use two (2) or more diameters (e.g. a cylinder) as a datum for the parallelism measurement with one of these diameters being coincident with the same diameter used to measure concentricity. The more points probed at step 208, the higher the degree of accuracy. The workpiece will be found to be concentric with the rotary axis of the NC machine's work table if the rotary axis passes through the center of the circle fitted through the probed points. If the workpiece is not concentric with the work table, it may be assessed at step 210 whether the deviation from concentricity is within a predetermined tolerance. Typical tolerances for concentricity of toothed members (e.g. curvic couplings) are between 0.0002 and 0.002 inches. If this is not the case, the location of the center of the fitted circle is shifted as needed at step 212 to bring the concentricity within tolerance. In one embodiment, only two (2) linear axes (typically X and Y axes) are needed to compensate for an out-of-concentricity condition. Such shifting may be performed manually, using a robot, or by a controller-based compensation method if available. The method may then flow back to repeat steps 208 and 210. When it is determined at step 210 that the concentricity is within tolerance, the method proceeds with the step 108 of FIG. 2 of adjusting the cutting tool parameters as needed and subjecting the cutting tool to an initial dressing operation.

It should be understood that the concentricity may be verified prior to verifying the parallelism of the workpiece and the order of steps 202 to 212 may be changed accordingly. It should also be understood that steps 204 and 210 may not be performed if it is already determined from the acquired measurements (e.g. at steps 202 and 208) that no deviation from parallelism or concentricity exists.

Figure 4:
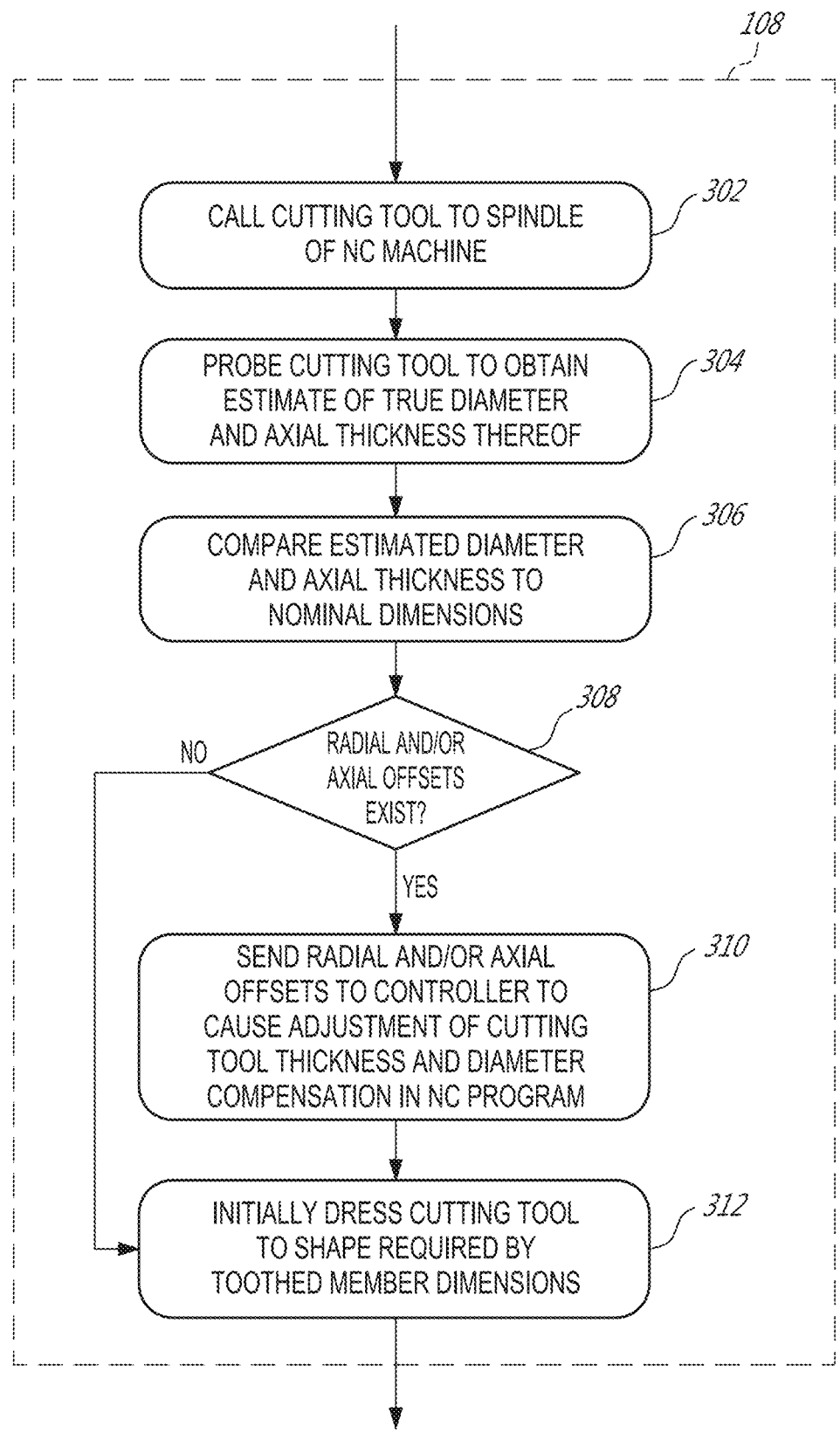
FIG. 4 is a flowchart of the step of FIG. 2 of adjusting cutting tool parameters and subjecting the cutting tool to an initial dressing operation.

Referring now to FIG. 4 in addition to FIG. 2, the step 108 of adjusting the cutting tool parameters as needed and subjecting the cutting tool to an initial dressing operation illustratively comprises calling the cutting tool to the NC machine's spindle (e.g. the NC machine's main shaft) from an automatic tool changing (ATC) system on the NC machine. In some embodiments, the NC machine may indeed store a plurality of tools in a tool magazine, with each tool being called (e.g. brought) to the spindle (e.g. by the ATC) when the tool is to be used. Some NC machines further have automatic nozzle changing capability, with each cutting tool having a dedicated coolant manifold to optimally cool and flush the grinding zone. This eliminates the need for an operator to install and align nozzles in the setup. The next step 304 may then be to probe the cutting tool with a suitable measuring device (e.g. laser or touch tool probing system) to obtain an estimate of the true (or real) diameter and axial thickness of the cutting tool. The estimated diameter and axial thickness may then be compared to nominal dimensions and it may be determined at step 308 whether offsets (i.e. radial and/or axial) from the nominal dimensions exist. It may be desirable for the cutting tool to be wide enough to cover at least half of the width of a space between two adjacent teeth formed on the workpiece, yet narrow enough to pass through the tooth space (or tooth slot) during machining.

As used herein, the term "nominal" as applied to a part, surface, geometrical element, etc., is intended to refer to the part, surface, geometrical element (e.g. a surface, profile, angle, plate, or other feature defining the part), etc., as defined in a theoretical model such as a Computer Aided Design (CAD) model or other digitally stored or recreated model, without tolerance, which may be used as a reference when machining one or a plurality of similar actual parts, surfaces, geometrical elements, etc. The term "real", "actual", or "true" as applied to a part, surface, geometrical element, etc., is intended to refer to the real, physical part, surface, geometrical element, etc., at various stages of the manufacturing process, including any variation brought by that process.

If it is determined at step 308 that radial and/or axial offsets from nominal dimensions exist, the one or more offsets are sent at step 310 to the NC machine controller to cause adjustment of the cutting tool's thickness and diameter compensation in an NC dressing program for the cutting tool. If it was determined at step 308 that no offsets exist or after step 310 has been performed, the cutting tool is subjected at step 312 to an initial dressing operation in accordance with the NC dressing program.

In one embodiment, the cutting tool is a dressable cup-shaped grinding wheel that may be dressed by the use of a dressing tool, such as a wheel or grinding dresser. In one embodiment, the dressing tool is a rotary dresser, e.g. a disc with a hard material, such as diamond, attached to the edge. It should however be understood that other types of dressing tools, e.g. stationary dressing tools, may apply. It should also be understood that, although toothed members, such as curvic couplings, may be ground using plated grinding wheels, where the tooth form is manufactured onto the wheel, it is preferable to use dressable wheels to ensure on-machine adjustment of the shape of the toothed member, as will be discussed further below. As used herein, the term dressing refers to an operation of removing a current layer of abrasive material on the cutting tool so as to modify a profile of the cutting tool. The abrasive material includes, but is not limited to, aluminum oxide, silicon carbide, and vitrified cubic boron nitride (CBN), with each abrasive grain serving as a small cutting element. Selection of the abrasive material illustratively depends on cost, required tolerances, and part material.

The NC dressing program is illustratively generated to move the face of the cutting tool (e.g. the grinding wheel) across the radius (or edge) of the dressing tool in order to create a desired profile for the cutting tool, the profile corresponding to a shape required by the dimensions of the toothed member to be machined. Indeed, the dressing operation performed at step 312 in accordance with the NC dressing program illustratively modifies the profile (or geometry) of the cutting tool so as to achieve in the cutting tool a profile that will create a desired tooth profile or pattern (e.g. as defined in a theoretical model such as a CAD model) in the toothed member when the latter is machined by the cutting tool. The dressing operation of step 312 may involve plunging the cutting tool, e.g. the grinding wheel, into a shaped roll of abrasive material. Alternatively, the required shape may be formed on the grinding wheel by moving the latter over a radius on a single point or rotary-type dresser in accordance with the NC dressing program. The latter technique may be preferable as it allows for the tooth profile to be modified by adjusting the NC program for correcting errors owing to stackup of tolerances or misalignments in axes of the NC machine cutting tool. In one embodiment, an acoustic emission sensor may be employed to find the position where the cutting tool touches the dresser and to ensure an even and complete dressing of the cutting tool. The NC dressing program may be fully parametric, e.g. equation-based, such that the dressing tool path and hence the shape of the cutting tool (e.g. the wheel shape) can be updated by changing parameters in the NC program from the probed dimensions (i.e. pressure angle and tooth width).

Referring back to FIG. 2, after the cutting tool has been initially dressed at step 108, automated machining of the workpiece may be performed at step 110, as will be discussed further below with reference to FIG. 5. Step 110 illustratively comprises generating a machining (e.g. NC) program comprising commands that indicate a numerically-controlled tool path to be followed by at least the cutting tool for machining the workpiece and manufacturing the toothed member. Similarly to the NC dressing program, the NC machining (e.g. grinding) program may be fully parametric, e.g. equation-based, such that the machining tool path is updated by changing parameters in the NC program. Post-machining, the machined workpiece (i.e. the finished toothed member) may be inspected at step 112. Step 112 may comprise verifying concentricity, perpendicularity, and/or parallelism of the freshly machined workpiece by probing. For this purpose, the automated loading/unloading system (or the operator) removes the workpiece and fixture from the NC machine and the workpiece is sent to an inspection station at a remote location. In one embodiment, three (3) or more teeth are probed on the machined workpiece to measure concentricity, perpendicularity, and parallelism of the tooth pattern. A contact pattern check typical for inspection of toothed members, such as curvic coupling, may also be performed on the machined workpiece. In one embodiment, the contact pattern check may comprise application of a gear marking compound on a master gauge, which may be a produced toothed member having a geometry that is complementary (e.g. the mirror image) to that of the toothed member to be machined. The master gauge is then seated on the freshly machined workpiece, tapped into place using a suitable tool (e.g. a hammer) and removed. The gear compound transferred to the teeth on the workpiece then indicates the manner in which the mating teeth (i.e. the teeth of the master gauge and of the machined workpiece) contact each other. From the transfer pattern of the gear compound, it can be determined if satisfactory contact is made between the master gauge and the freshly machined workpiece. An acceptable contact pattern may be defined by requirements such as a well-centered shape, a given percentage of teeth in contact, and a limited number of consecutive teeth missing contact.

In the proposed automated machining process, an acceptable contact pattern may be ensured at step 112 by selecting a suitable abrasive material for the cutting tool. An acceptable contact pattern can also be ensured by sufficiently dressing the cutting tool at step 108 to ensure that the cutting tool's form does not break down during the machining process and that any undesirable tooth profiles that may be found on the workpiece are completely removed. In addition, the pressure angle, tooth geometry and machine offsets may be initially verified on a test ring with the above-mentioned contact pattern check. Periodic measurements and adjustments can be taken from time to time to reduce the possibility of drift. Moreover, using a precise, well-aligned and well-maintained machine and ensuring the dressing tool is replaced at suitable intervals to prevent excessive wear to machine the workpiece can achieve an acceptable contact pattern. Finally, keeping the NC machine and probing system accurate and well-aligned through frequent calibrations and adjustments (e.g. ball-bar checks) can also achieve an acceptable contact pattern.

If the contact pattern is found to be unacceptable at step 112, the NC machine and NC program may be recalibrated and adjusted. Acceptable results may be confirmed by testing on representative test rings. The workpiece can then be returned to the NC machine for a rework cycle (i.e. for repeating steps 102 to 112). Removing a small amount of material by plunging into the workpiece with a correctly dressed cutting tool will usually be sufficient to restore the workpiece surfaces to an acceptable contact pattern.

Figure 5:
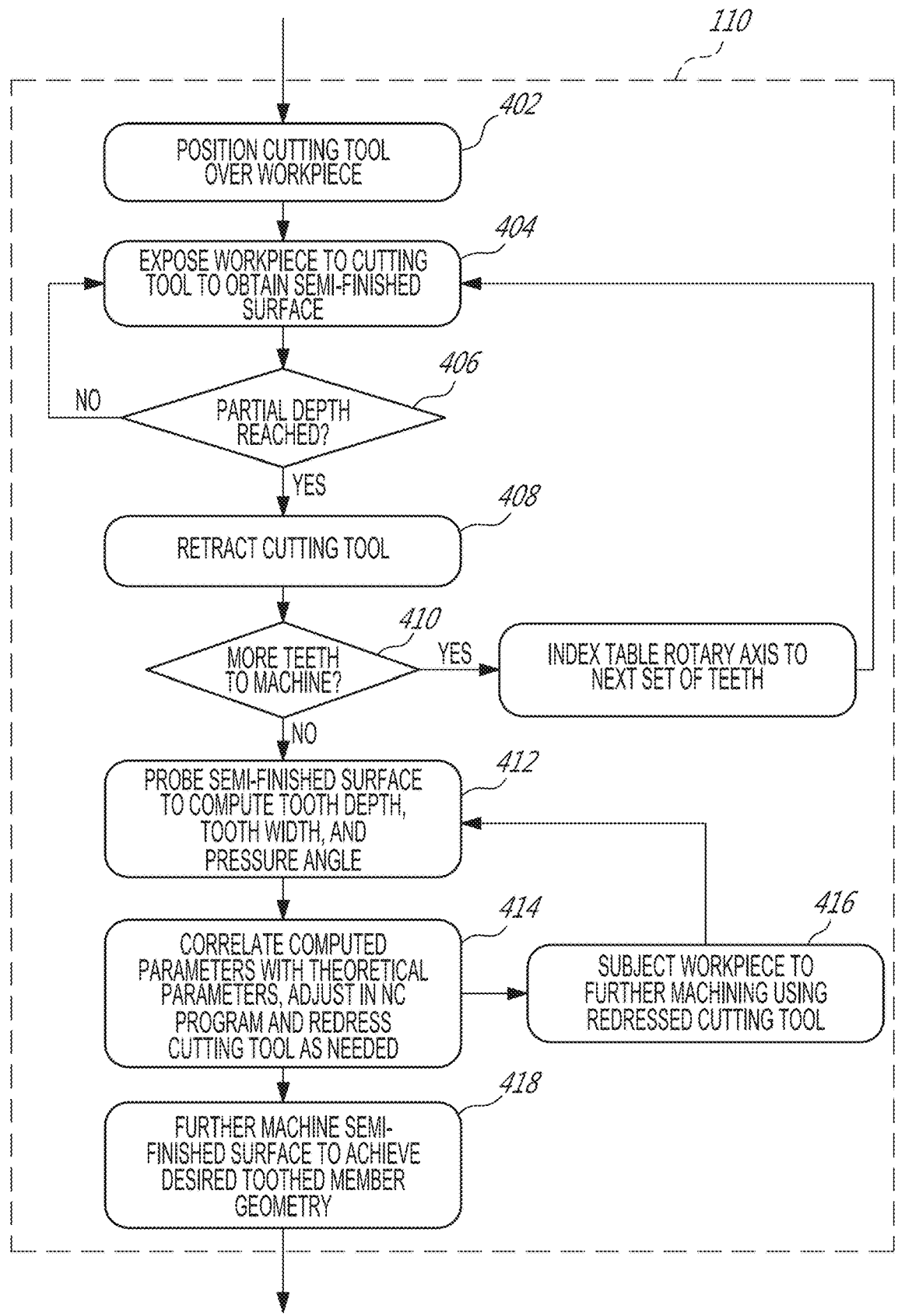
FIG. 5 is a flowchart of the step of FIG. 2 of automated machining of the workpiece.

Referring now to FIG. 5, the step 110 of automated machining of the workpiece illustratively comprises the step 402 of positioning the cutting tool over the workpiece at a desired location. At step 404, the workpiece is exposed to the cutting tool, e.g. the cutting tool is plunged into the workpiece up to a predetermined partial depth, in order to obtain a semi-finished surface comprising a plurality of rough tooth slots. The partial depth is smaller than the desired full depth up to which the workpiece is to be machined. In one embodiment, the partial depth is in a range between 30% and 50% of the full depth. It should be understood that other ranges may apply so long as the partial depth that is reached enables to measure parameters (e.g. dimensions) of the semi-finished surface (as will be discussed further below) and allows for subsequent adjustments (e.g. further machining) to be performed on the semi-finished surface, if needed.

The next step 406 may therefore be to assess whether the predetermined partial depth has been reached. If this is not the case, the workpiece may be further machined by returning to step 404. Once the cutting tool has machined the workpiece up to the partial depth as determined at step 406, the next step may be to retract the cutting tool and assess at step 410 whether more teeth need to be machined. If this is the case, the rotary axis of the NC machine's work table may be indexed to the next set of teeth to be machined and the method may flow back to step 404 for repeating the machining process for the next set of teeth. The procedure is repeated until all teeth are ground in the workpiece up to the required partial depth. It should be understood that, depending on the requirements, each tooth may be machined up to the partial depth in several steps. For example, in order to achieve a desired tooth taper towards the center of the toothed member, the cutting tool may first machine half of each tooth slot and the workpiece rotated for machining the other half of the tooth slot. Also, due to the cutting tool's annular shape and position (e.g. off-axis) over the workpiece, during each pass of the cutting tool, the half of a first tooth slot may be machined concurrently to the half of a second tooth slot located a predetermined distance (e.g. eight (8) to ten (10) teeth) away from the first tooth slot. In this manner, teeth can be machined using an event amount of material and balance can be achieved in the machining process.

Once it is determined at step 410 that the workpiece has been machined such that all teeth have been ground up to the partial depth, the method may flow to the step 412 of probing the resulting semi-finished surface. The semi-finished surface may be probed using any suitable measuring device, such as an on-machine part probing system, scanning probe, touch probe, or the like, as discussed above and step 412 may therefore comprise instructing the measuring device to acquire the measurements (e.g. dimensions) of the workpiece. In one embodiment, locations on a top face and a bottom surface of the workpiece as well as two or more points on each pressure surface of one or more teeth of the workpiece are probed. Parameters (e.g. dimensions) of the machined workpiece may then be computed on the basis the measurements acquired by probing. In one embodiment where curvic couplings are being machined, the tooth depth, tooth width, and pressure angle are computed. It should be understood that in other embodiments, more or less parameters may be computed. For example, an "X value" parameter, which is indicative of a distance from the center of the cutting tool to the center of the workpiece, may be computed. Also, when the method described herein is used to manufacture a spline, different geometry may be measured and calculated. It should also be understood that other dimensions of the workpiece, including but not limited to surface finish, temperature, or the like, may be acquired.

As will be discussed further below with reference to FIG. 7, at step 414, the computed parameters may then be compared to theoretical parameters, e.g. parameters obtained from a virtual tooth profile, such as a scanned master gauge, the NC program adjusted, and the cutting tool subjected to further dressing as needed. If the cutting tool is redressed, the workpiece is illustratively subjected to further machining by the redressed cutting tool at step 416 in order to bring the parameters of the semi-finished surface within tolerance of the theoretical parameters. After the workpiece is further machined, steps 412 and 414 may be repeated until none of the parameters are found at step 414 to be beyond tolerance. Once it is found that the parameters of the semi-finished surface are within tolerance of the theoretical parameters, the semi-finished surface may be further machined at step 418, i.e. the rough slots machined by the cutting tool up to the full depth, in order to achieve the desired toothed member geometry, as will be discussed further below.

FIG. 6a illustrates a cutting tool, i.e. a grinding wheel 502, being plunged into (e.g. along the direction of arrow A) an annular workpiece 504 for grinding along a perimeter thereof a plurality of teeth as in 506. In the illustrated embodiment, the workpiece is being machined to form a convex curvic coupling. It can be seen from the embodiment of FIG. 6a that the grinding wheel 502 has an axis of rotation B and is not concentric with the workpiece 504.

Figure 6C:
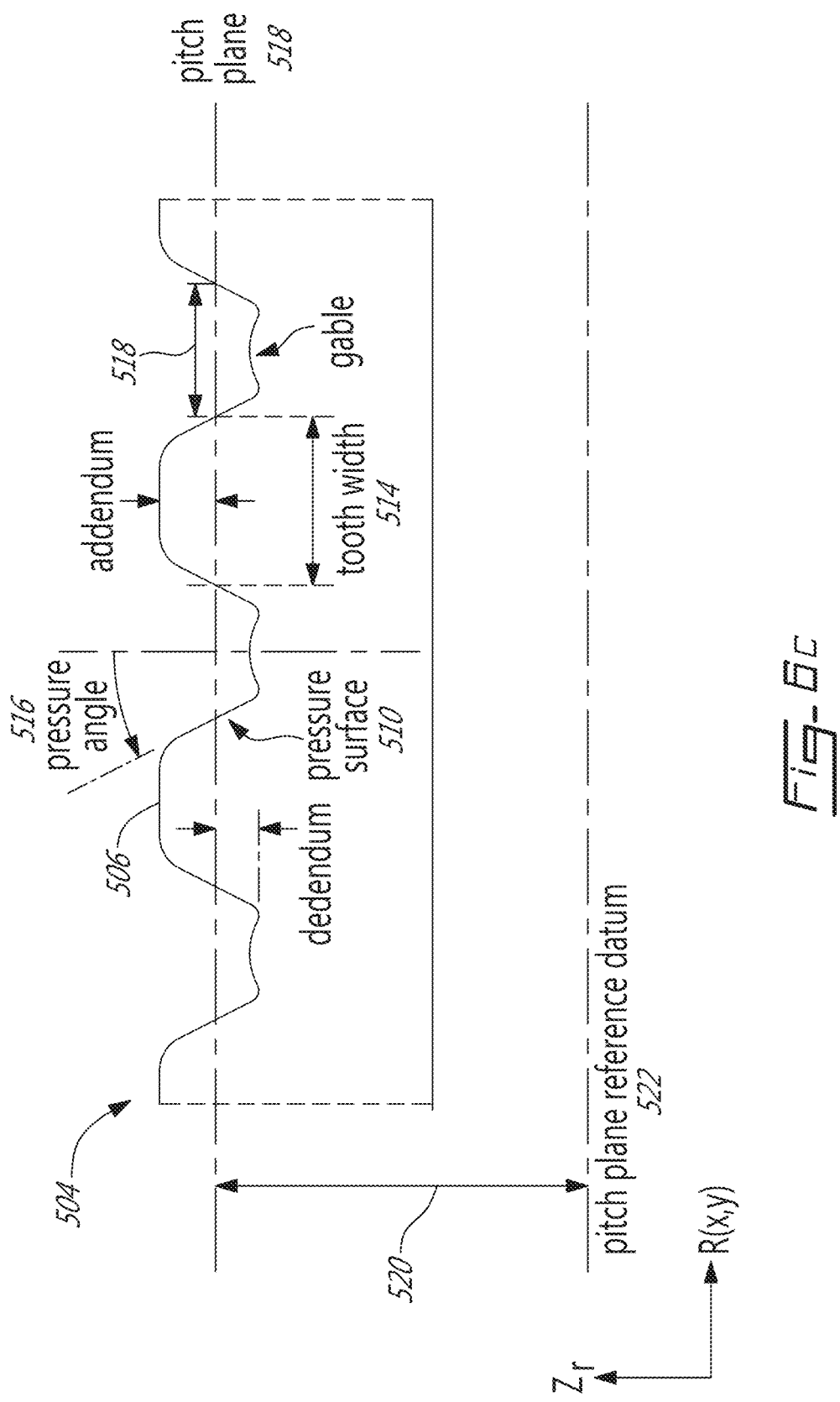
FIG. 6c is a schematic diagram showing the tooth form of a toothed member, in accordance with an illustrative embodiment.

As can be seen in FIG. 6b, the teeth 506 machined in the workpiece 504, e.g. the curvic coupling, each have a root 508 and a pressure surface 510. The tooth depth 512 can be measured as the overall height of each tooth 506 as measured from the root 508 while the tooth thickness 514 is the width of each tooth at the addendum (not shown). As can be seen in FIG. 6c, which illustrates the tooth form for a toothed member, such as the curvic coupling 504 of FIG. 6b, each tooth 506 further has a given pressure angle 516 that is measured as the angle between a tangent to the tooth profile (i.e. a tangent to the pressure surface 510) and a line perpendicular to the pitch plane (or pitch surface) 518. Other geometrical elements of the teeth 506 (e.g. the dedendum, addendum, gable, and the like) will be apparent to those skilled in the art.

Figure 6D:
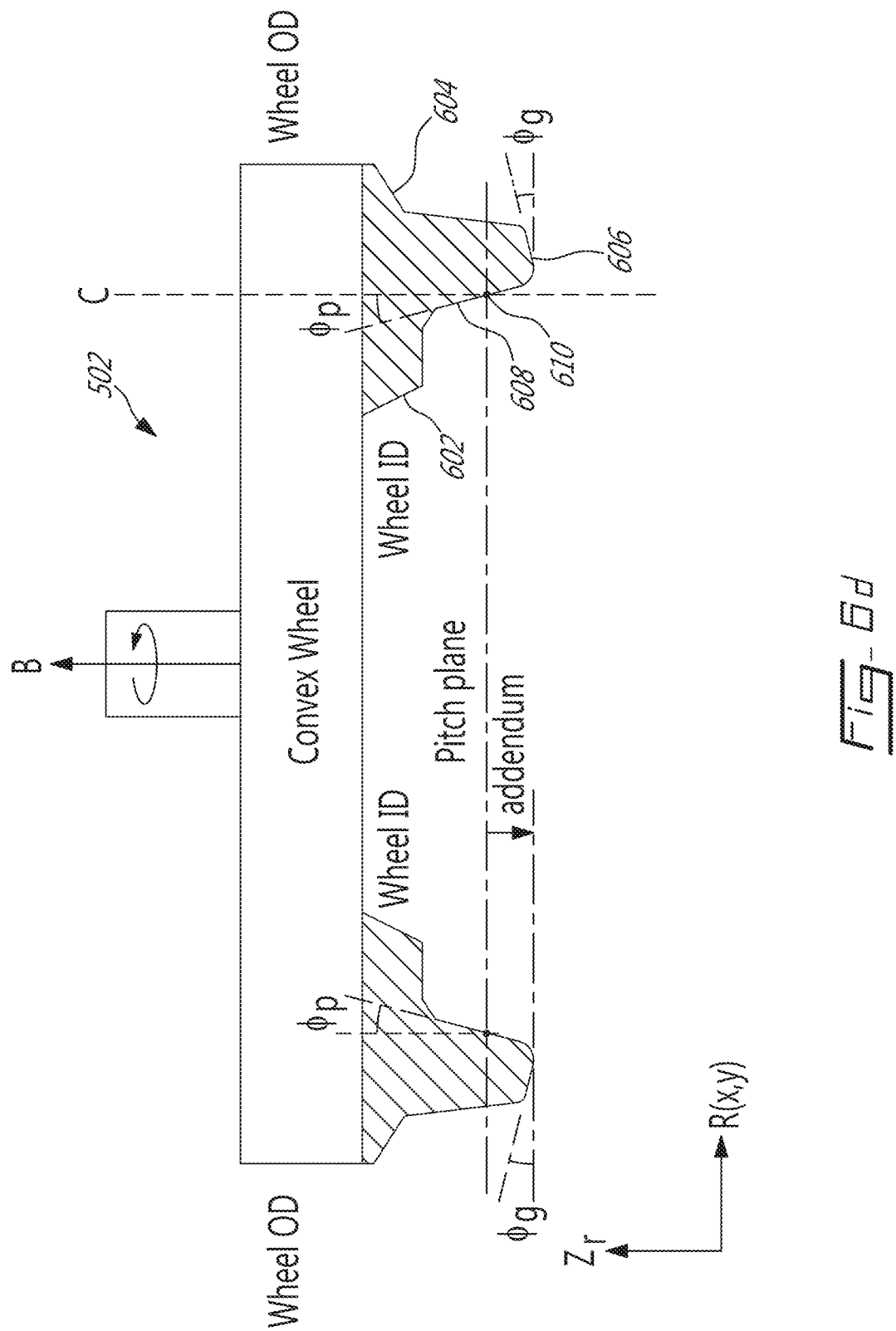
FIG. 6d is a schematic diagram showing the profile of a convex cutting tool, in accordance with an illustrative embodiment.

Referring to FIG. 6d in addition to FIG. 6a, there is illustrated a profile (not to scale) of the grinding wheel 502 for a convex curvic coupling, in accordance with one embodiment. It should be understood that various profiles other than the one illustrated in FIG. 6d may apply. The grinding wheel's profile comprises, at an inner diameter (ID) of the wheel 502 (referred to "Wheel ID" in FIG. 6d), an inner surface 602, an outer surface 604 at an outer diameter (OD) of the wheel 502 (referred to "Wheel OD" in FIG. 6d), and a bottom face or edge, referred to as a gable 606. The gable 606 usually has a small angle $\phi_g$ of zero (0) to five (5) degrees in order to eliminate the mismatch between the two sides of a tooth. If the gable angle is zero, a mismatch results from the fact that for each tooth (e.g. machined using the grinding wheel 502), one half is ground at one contact arc between the grinding wheel 502 and the workpiece, while the other is ground at a second arc. However, for a particular tooth, the two tooth halves are illustratively not ground simultaneously, as discussed above. As can be seen from FIG. 6a, the shape root plane (not shown) of the workpiece 504 can be created by the gable 606 of the grinding wheel 502 while the pressure surfaces (reference 510 in FIG. 6b) are shaped by the inner and/or outer surfaces 602, 604 respectively provided at an inner diameter (ID) and an outer diameter (OD) of the wheel 502. In particular, the convex tooth profile of the machined curvic coupling may be produced by the inner surface 602 of the grinding wheel 502 with the pressure surfaces 510 of the toothed member being created by a pressure surface 608 provided at the wheel's inner surface 602. The pressure angle $\phi_P$ of the pressure surface 608 in turn defines the toothed member's pressure angle (reference 516 in FIG. 6c). Therefore, the profile of the grinding wheel 502 determines the tooth profile created in the machined toothed member and the cutting tool is dressed accordingly to achieve a desired tooth profile.

Figure 6E:
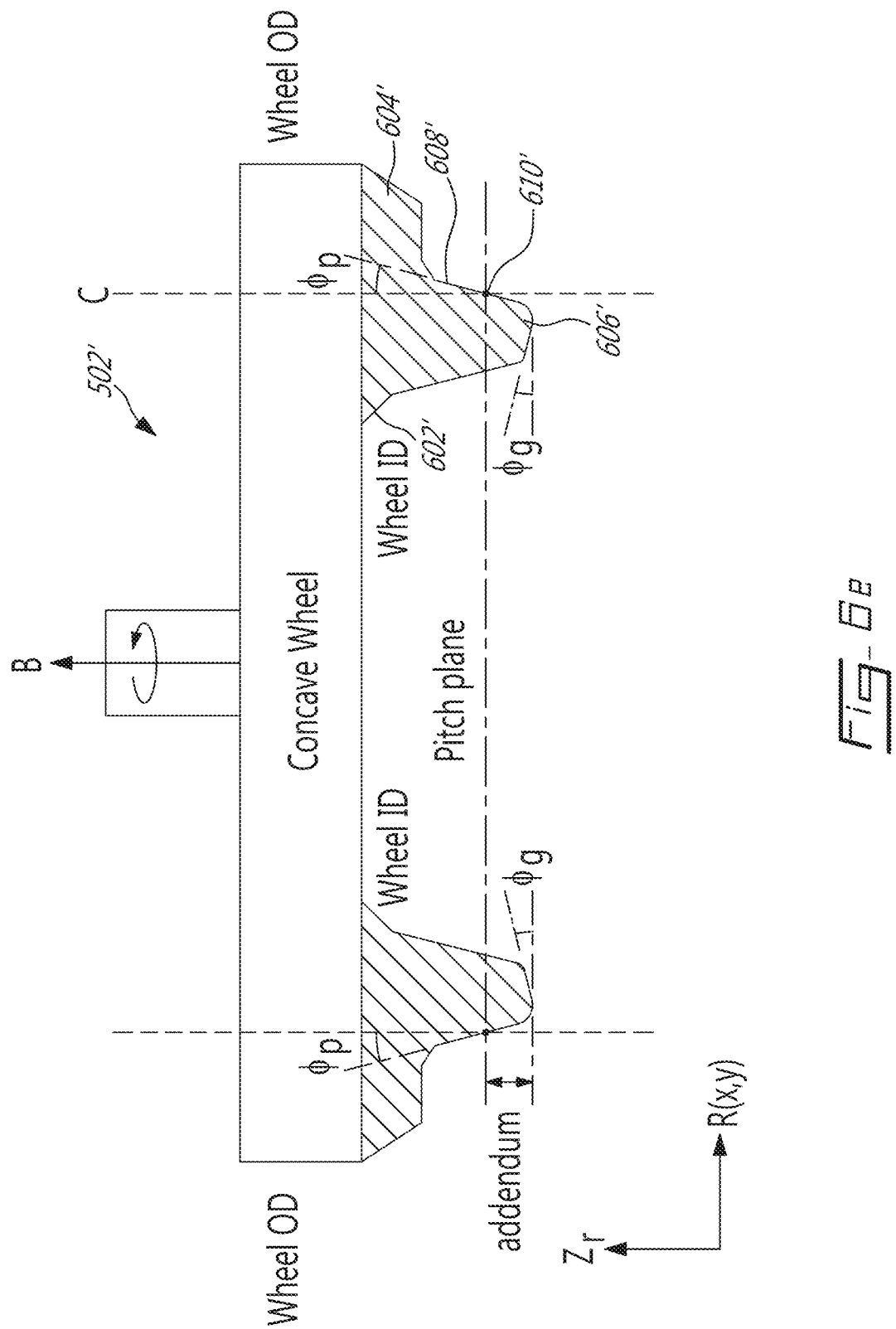
FIG. 6e is a schematic diagram showing the profile of a concave cutting tool, in accordance with an illustrative embodiment.

FIG. 6e illustrates, in accordance with one embodiment, a profile of a concave grinding wheel 502' used to machine concave curvic couplings that match the convex curvic couplings machined using the grinding wheel 502 of FIG. 6d. The grinding wheel 502' comprises an inner surface 602' at the ID of the wheel 502' (referred to "Wheel ID" in FIG. 6e), an outer surface 604' at the OD of the wheel 502' (referred to "Wheel OD" in FIG. 6e), and a gable 606' having an angle $\phi_g$. The pressure surfaces of a concave toothed member are created by a pressure surface 608' provided at the wheel's outer surface 604'. The pressure angle $\phi_P$ of the pressure surface 608' in turn defines the toothed member's pressure angle (reference 516 in FIG. 6c). The concave profile of the wheel 502' is illustratively a mirror image of the convex profile of the wheel 502 of FIG. 6d about an axis C, which is substantially parallel to the tool axis B and centered at the wheel's pitch plane points (references 610 and 610' in FIG. 6d and FIG. 6e).

Figure 7:
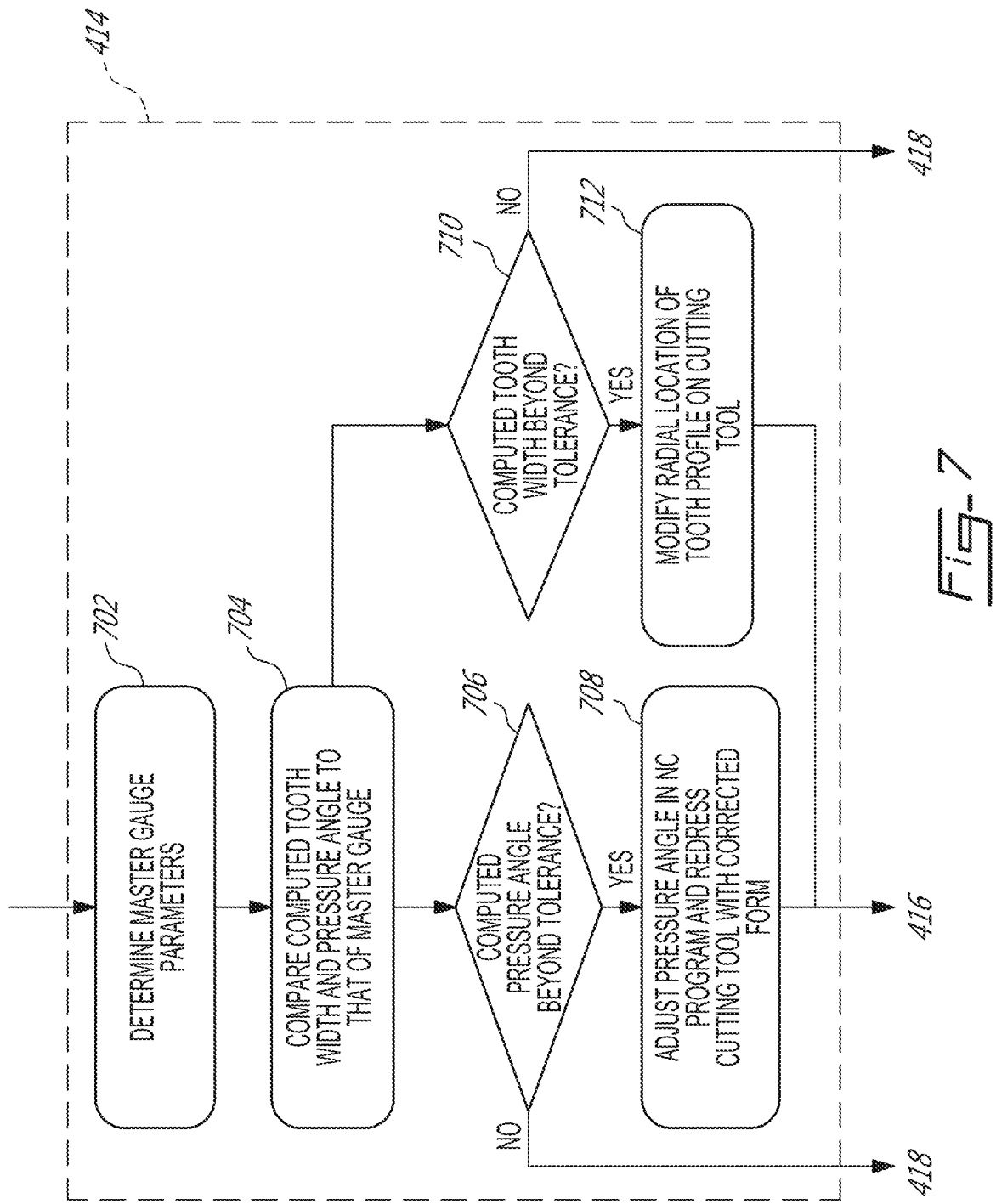
FIG. 7 is a flowchart of the step of FIG. 5 of correlating parameters computed for a semi-finished workpiece to master gauge parameters.

Referring now to FIG. 7, the step 414 of comparing the parameters (e.g. tooth depth, tooth width, and pressure angle) computed for the partially-machined (i.e. semi-finished) workpiece to theoretical (or nominal) dimensions illustratively comprises correlating the computed parameters with theoretical parameters defined in a theoretical model for the toothed member to be machined. In one embodiment, the theoretical parameters are obtained from a master gauge, which has been designed and produced to have the desired tooth profile to be achieved in the finished toothed member. It should however be understood that the theoretical parameters may alternatively be obtained from a solid model of a nominal part. Still, since machined parts are typically inspected post-machining using a master gauge, as discussed herein above, and since mater gauges typically exhibit deviations from nominal part models, it is preferable to calibrate the probed toothed member dimensions with respect to the master gauge. Step 414 therefore illustratively comprises characterizing the master gauge to determine parameters thereof at step 702. This may involve scanning the master gauge surfaces using a high precision measurement system. For example, as illustrated in FIG. 8, the master gauge 802 may be analyzed on a scanning CMM 804. Reconstructed surfaces 806 of the master gauge teeth may then be obtained from the CMM inspection and used to compute the master gauge's dimensions. Alternatively, the master gauge parameters may be determined at step 702 by installing the master gauge on the machined workpiece and inferring the master gauge dimensions through measurement with manual gauging.

The tooth width and pressure angle computed at step 412 of FIG. 5 are then compared at step 704 to the theoretical tooth width and pressure angle values obtained from characterization of the master gauge. This may be done by computing a difference or deviation between the computed and theoretical values. Once the computed pressure angle has been compared to that determined form the master gauge, the method may assess at step 706 whether the computed pressure angle is beyond a predetermined tolerance of the theoretical pressure angle (e.g. obtained from the master gauge measurements). The tolerance is illustratively defined by engineering drawings or manufacturing operation sheets. In one embodiment, the tolerance is ±5 minutes of a degree. If this is not the case (i.e. the computed pressure angle is not beyond a predetermined tolerance of the theoretical pressure angle), the method may flow to the step 418 of FIG. 5, i.e. further machine the semi-finished surface to achieve the desired toothed member geometry. Otherwise, if the computed pressure angle is beyond the tolerance, the NC dressing program is accordingly adjusted at step 708 such that, upon the cutting tool being redressed, the cutting tool's profile (e.g. the inner surface of the cutting tool) has a corrected pressure angle that in turn brings the pressure angle of the workpiece machined with the redressed cutting tool within tolerance. Indeed, since the workpiece's tooth pattern is created by the cutting tool's geometry and the profile of the cutting tool accordingly corresponds to the tooth pattern to be achieved, the workpiece's pressure angle can be adjusted by modifying the cutting tool's pressure angle.

At step 708, the cutting tool is thus subjected to a new dressing operation according to the adjusted NC program, leading to a redressed cutting tool having a corrected form (i.e. a pressure angle within tolerance). It should be understood that when adjusting the pressure angle and redressing the cutting tool accordingly, it is desirable to ensure that enough material is removed from the cutting tool so that the previous pressure angle is completely removed from the cutting tool's profile and replaced with the new pressure angle. In one embodiment, due to high sensitivity to pressure angle, the pressure angle need only be modified slightly (e.g. by less than one (1) degree) in order to achieve a desired correction. Also, rather than adjusting the pressure angle by redressing the cutting tool, the pressure angle may be adjusted by tilting (e.g. angling) the cutting tool relative to the axis B of FIG. 6d. Still, redressing may be desirable in order to ensure full automation of the machining process and minimize human intervention. The next step 416 may then be to subject the workpiece to further machining using the redressed cutting tool, as discussed above with reference to FIG. 5. As a result of redressing the cutting tool, the pressure angle of the re-machined workpiece is brought within tolerance of the master gauge pressure angle.

Once the computed tooth width has been compared to the tooth width determined form the master gauge, the method may further assess at step 710 whether the computed tooth width is beyond a predetermined tolerance of the theoretical (e.g. master gauge) tooth width. The tolerance is illustratively defined by engineering drawings or manufacturing operation sheets. In one embodiment, the tolerance is ±0.0006 inches. It should however be understood that compliance of the tooth width with tolerances may be verified prior to verifying compliance of the pressure angle with tolerances and the order of steps 706 to 712 may be changed accordingly. If it is determined at step 710 that the computed tooth width is within tolerance, the method may flow to the step 418 of FIG. 5, i.e. further machine the semi-finished surface to achieve the desired toothed member geometry. Otherwise, if the computed tooth width is beyond the tolerance, the radial location of the cutting tool's profile (i.e. adjusting the radial distance between the cutting tool and the dressing tool) is automatically modified in the NC program at step 712. Indeed, since the workpiece's tooth pattern is created by the cutting tool's geometry and the profile of the cutting tool accordingly corresponds to the tooth pattern to be achieved, the workpiece's tooth width can be adjusted by adjusting the radial location of the cutting tool's profile. The cutting tool is then subjected to a new dressing operation according to the modified NC program and the workpiece subjected to further machining at step 416 using the redressed cutting tool, as discussed above with reference to FIG. 5. The entire cycle of probing, comparing, redressing and machining the workpiece with the redressed cutting tool may then be repeated as necessary until the workpiece's tooth width is brought within tolerance of the master gauge tooth width.

Referring back to FIG. 6c, the tooth width 514 measured on the workpiece 504 is illustrated. It can be seen from FIG. 6c that the tooth width 514 can be controlled by adjusting the radial offset 518, and accordingly by adjusting the radial location of the cutting tool's profile. Indeed, adjusting the value of the radial offset 518 modifies the shift or deviation in the radial direction R(x,y) of the workpiece's tooth profile relative to the nominal tooth profile. It can be seen from FIG. 9 that, if the radial offset is sufficiently small (e.g. when 75% of the tolerance of the engineering drawing or manufacturing operating sheet is achieved), meaning that the deviation of the measured tooth width from the nominal tooth width is small (i.e. within tolerance), no redressing of the cutting tool may be needed.

As shown in FIG. 9, the radial location of the cutting tool's profile, e.g. the profile of the grinding wheel 502, can be adjusted by shifting (e.g. in the X or Y direction) the driving point 902 of the cutting tool 502 and subsequently redressing the cutting tool 502. The cutting tool's driving point 902 is illustratively defined in the NC program as a point where the cutting tool 502 is controlled by the NC machine. In the illustrated embodiment, the driving point 902 is located on the gable (reference 606 in FIG. 6d) of the cutting tool 502. It should be understood that the driving point 902 may alternatively be located at another location on the cutting tool 502, as defined by a user.

FIG. 9 further illustrates the NC toolpath that the cutting tool 502 takes for OD and ID dressing, with the convex curvic tooth form shown. In one embodiment, the dressing tool 904 is fixed and has a given dressing radius or edge (not shown) and the face of the cutting tool 502 is moved across the dressing radius in order to create a desired profile for the cutting tool 502. In the illustrated embodiment, one side (OD or ID) of the cutting tool 502 is dressed first in a series of passes where the cutting tool 502 travels from an initial (e.g. "Start ID dress" or "Start OD dress") position to a final (or "End OD and ID dress") position and the cutting tool 502 is shifted downwards (along the Z axis, in the direction of arrow F) after each pass. The cutting tool 502 is then re-positioned to the initial position at the opposite side (OD if the ID side was dressed first) and the procedure is repeated until both sides of the cutting tool 502 are fully dressed with the desired (e.g. new) shape. After a number of successive dressing passes, the cutting tool 502 is then dressed from an initial tooth profile 906 (referred to as "Original profile" in FIG. 9) to a final profile 908 (referred to as "New profile" in FIG. 9). One side 910 of the dressing tool 904 illustratively dresses the cutting tool's ID side (e.g. the inner surface 602) while the opposite side 912 of the dressing tool 904 dresses the cutting tool's OD side (e.g. the outer surface 604).

Figure 10A:
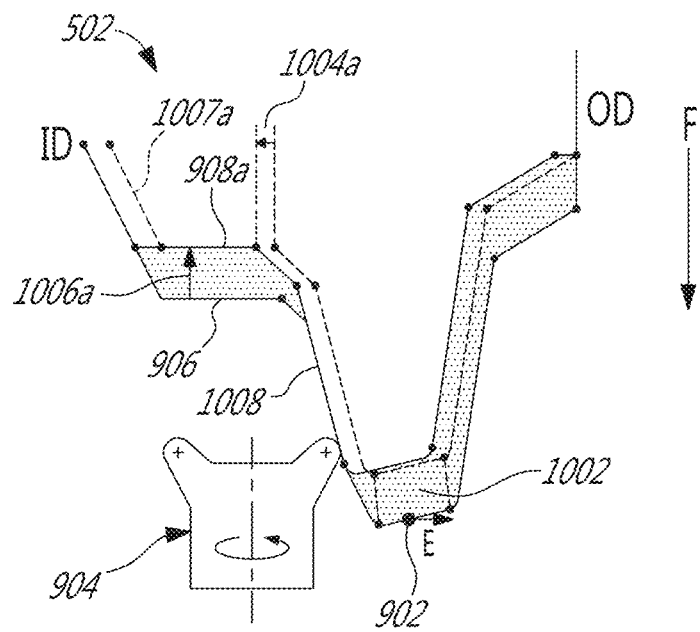
FIG. 10a and FIG. 10b are schematic diagrams showing redressing of a convex cutting tool profile, in accordance with one embodiment.
Figure 10B:
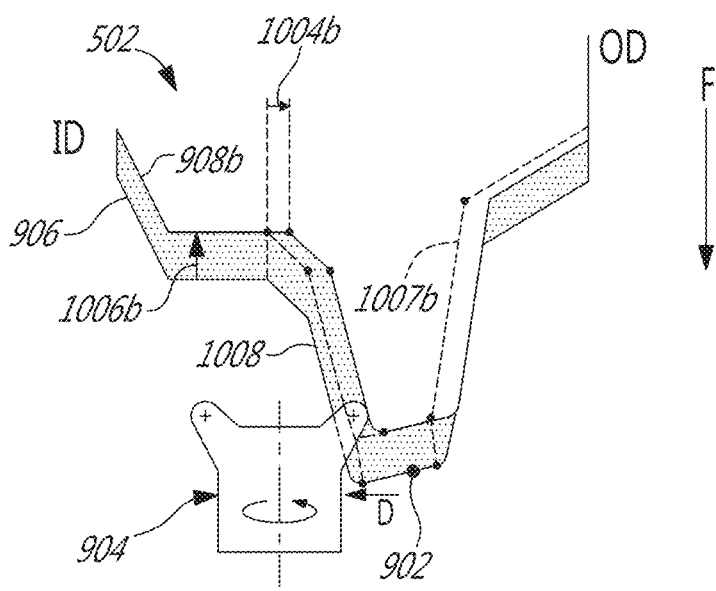
Figure 10C:
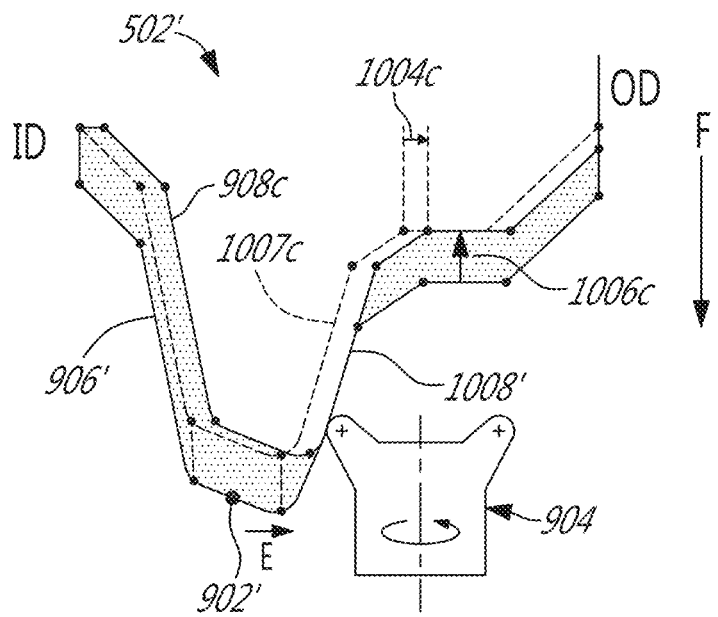
FIG. 10c and FIG. 10d are schematic diagrams showing redressing of a concave cutting tool profile, in accordance with one embodiment.

Depending on the required tool width adjustment, the driving point 902 may be shifted closer to (e.g. in the direction of arrow D) or further away from (e.g. in the direction of arrow E) the dressing tool 904, with the latter remaining stationary and dressing the cutting tool 502 upwards. The cutting tool's profile can then be shifted accordingly during the dressing cycle, as shown in FIG. 10a, FIG. 10b, FIG. 10c, and FIG. 10b. FIG. 10a and FIG. 10b illustrate shifting the radial location of a convex tooth profile while FIG. 10c and Fi. 10d illustrate shifting the radial location of a concave tooth profile.

In FIG. 10a, the driving point 902 of the convex cutting tool 502 is shifted (e.g. offset) towards the outer diameter (OD) of the cutting tool 502 (i.e. in the direction of arrow E) during dressing. As a result of the dressing operation performed by the dressing tool 904, a layer 1002 of abrasive material is removed from the cutting tool 502 and the cutting tool's profile is modified from the initial profile 906 (drawn as the bottom solid line in FIG. 10a) to the final profile 908a (drawn as the top solid line in FIG. 10a resulting from removal of the abrasive layer 1002). In particular, the profile 906 is shifted radially towards the inner diameter (ID) of the cutting tool 502 (i.e. in the direction of arrow 1004a) and shifted upwards (i.e. in the direction of arrow 1006a) to achieve the profile 908a. It can be seen that the profile 908a differs from a profile 1007a (drawn using a dashed line on FIG. 10a) that would have been achieved after dressing if the radial location of the driving point 902 had not been offset. Since the cutting tool's profile is shifted radially towards ID, the tooth width (reference 514 in FIG. 6c) created in the workpiece (reference 504 in FIG. 6c) with the grinding wheel 502 redressed in this manner will therefore be thinner than the tooth width machined using the original (not redressed) grinding wheel 502.

In FIG. 10b, the driving point 902 is offset towards ID (i.e. in the direction of arrow D) and the cutting tool's profile is therefore shifted radially towards OD (i.e. in the direction of arrow 1004b) and shifted upwards (i.e. in the direction of arrow 1006b) to achieve the final profile 908b (drawn as the upper solid profile line in FIG. 10b). As a result, the tooth width 514 will be wider. It can be seen that the profile 908b differs from a profile 1007b (drawn using a dashed line on FIG. 10b) that would have been achieved after dressing if the radial location of the driving point 902 had not been offset.

In FIG. 10c, the driving point 902' of a concave cutting tool 502' is offset towards OD (i.e. in the direction of arrow E) and the cutting tool's profile is accordingly modified from the initial profile 906' (drawn as the bottom solid profile line in FIG. 10c) to the final profile 908c (drawn as the upper solid profile line in FIG. 10c), with the profile 906' being shifted radially towards OD (i.e. in the direction of arrow 1004c) and shifted upwards (i.e. in the direction of arrow 1006c) to achieve the profile 908c. As a result, the tooth width 514 will be thinner. It can be seen that the profile 908c differs from a profile 1007c (drawn using a dashed line on FIG. 10c) that would have been achieved after dressing if the radial location of the driving point 902' had not been offset.

Figure 10D:
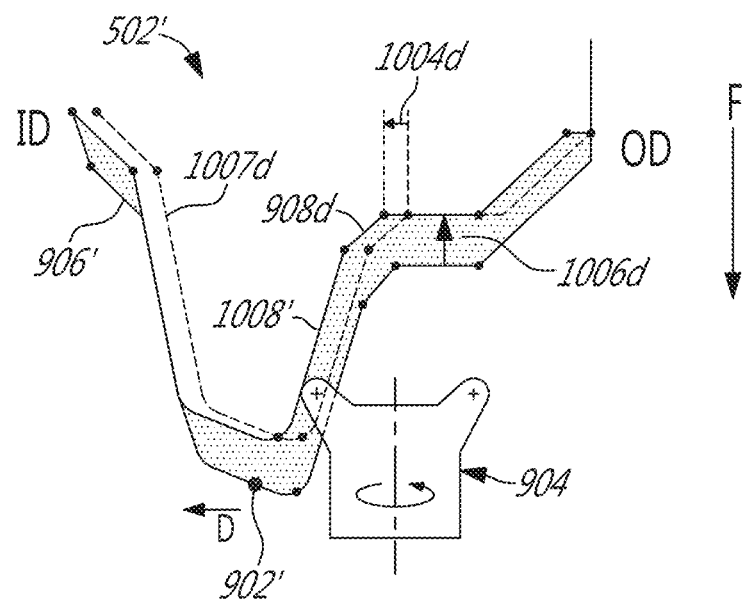

In FIG. 10d, the driving point 902' is offset towards ID (i.e. in the direction of arrow D) and the cutting tool's profile is shifted radially towards ID (i.e. in the direction of arrow 1004d) and shifted upwards (i.e. in the direction of arrow 1006d) to achieve the final profile 908d (drawn as the upper solid profile line in FIG. 10d). As a result, the tooth width 514 will be wider. It can be seen that the profile 908d differs from a profile 1007d (drawn using a dashed line on FIG. 10d) that would have been achieved after dressing if the radial location of the driving point 902' had not been offset.

Figure 11:
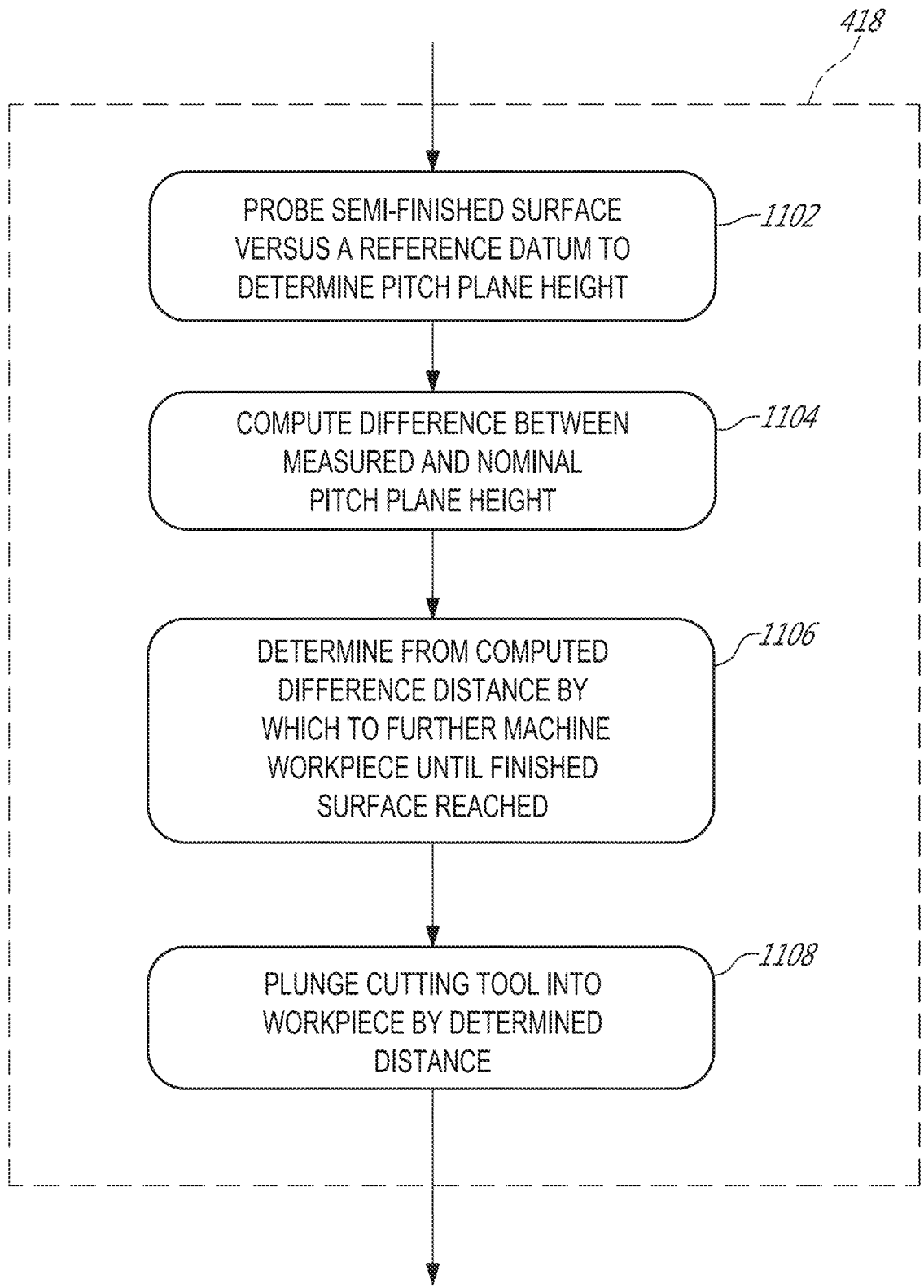
FIG. 11 is a flowchart of the step of FIG. 5 of further machining the semi-finished surface to achieve at the desired toothed member geometry.

Referring now to FIG. 11 and FIG. 6c, the step 418 of further machining the semi-finished surface to achieve the desired toothed member geometry illustratively comprises generating a machining program for bringing the height (reference 520 in FIG. 6c) of the workpiece's pitch plane (reference 516 in FIG. 6c) to a nominal pitch plane height (e.g. determined from the master gauge). In order to determine the pitch plane height 520, the semi-finished surface, particularly the top and/or bottom face of the machined workpiece, is probed at step 1102 versus a reference datum (reference 522 in FIG. 6c) that may be defined on the workpiece or fixture. Knowing the value of the tooth depth measured on the semi-finished workpiece (at step 412 in FIG. 5), the pitch height 520 can be calculated on the basis of the acquired measurements. A difference between the computed pitch plane height 520 and the nominal pitch plane height is then computed at step 1104. At step 1106, it is determined from the computed difference a distance (in the Z or "plunge" direction of FIG. 6c) by which to further machine the workpiece until the pitch plane height is brought to nominal. At step 1108, the cutting tool is then plunged into the workpiece by the distance determined at step 1106, thereby bringing the pitch plane height to nominal and achieving the desired finished surface (i.e. the desired toothed member geometry).

Figure 12:
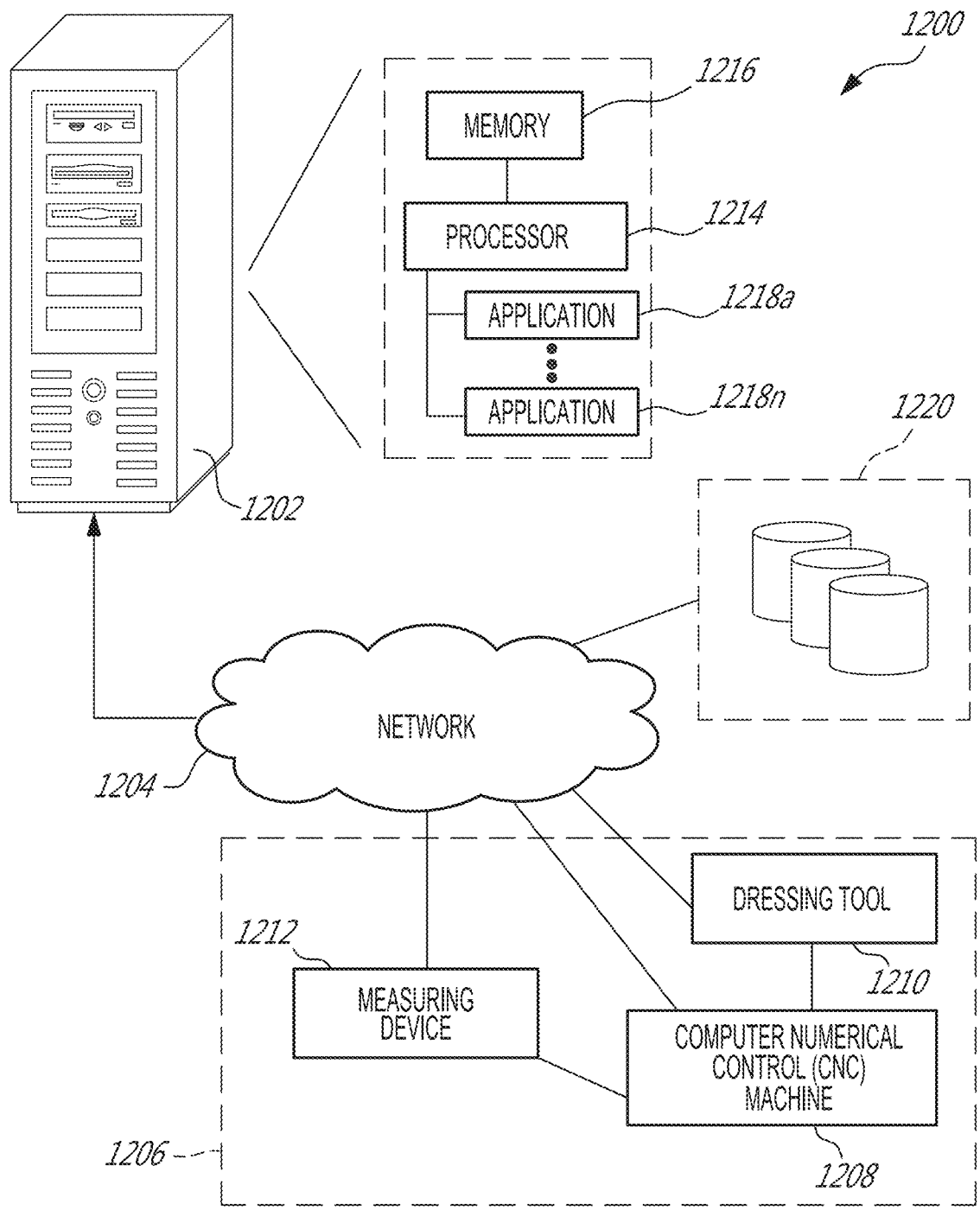
FIG. 12 is a schematic diagram of a system for machining a toothed member, in accordance with one embodiment.

Referring now to FIG. 12, a system 1200 for machining a toothed member will now be described. The system 1200 comprises one or more server(s) 1202. For example, a series of servers corresponding to a web server, an application server, and a database server may be used. These servers are all represented by server 1202 in FIG. 12. The server 1202 is in communication over a network 1204, such as the Internet, a cellular network, or others known to those skilled in the art, with a Computer Numerical Control (CNC) machining center 1206. The CNC machining center 1206 may comprise a CNC machine 1208 comprising a cutting tool (not shown) adapted to machine a workpiece (not shown) into the desired toothed member. The cutting tool part of the CNC machine 1208 may be dressed using a dressing tool 1210. The CNC machining center 1206 may further comprise a measuring device 1212, such as a probing system (not shown) integrated with the CNC machine 1208 or a CMM (not shown). It should be understood that the measuring device 1212 may comprise any other suitable part sensing system using one of a variety of contact and non-contact technologies.

The server 1202 may comprise, amongst other things, a processor 1214 coupled to a memory 1216 and having a plurality of applications 1218a, . . . , 1218n running thereon. The processor 1214 may access the memory 1316 to retrieve data. The processor 1214 may be any device that can perform operations on data. Examples are a central processing unit (CPU), a microprocessor, and a front-end processor. The applications 1218a, . . . , 1218n are coupled to the processor 1214 and configured to perform various tasks as explained below in more detail. It should be understood that while the applications 1218a, . . . , 12318n presented herein are illustrated and described as separate entities, they may be combined or separated in a variety of ways.

The memory 1216 accessible by the processor 1214 may receive and store data. The memory 1216 may be a main memory, such as a high speed Random Access Memory (RAM), or an auxiliary storage unit, such as a hard disk or flash memory. The memory 1216 may be any other type of memory, such as a Read-Only Memory (ROM), Erasable Programmable Read-Only Memory (EPROM), or optical storage media such as a videodisc and a compact disc.

One or more databases 1220 may be integrated directly into the memory 1216 or may be provided separately therefrom and remotely from the server 1202 (as illustrated). In the case of a remote access to the databases 1220, access may occur via any type of network 1204, as indicated above. The databases 1220 described herein may be provided as collections of data or information organized for rapid search and retrieval by a computer. The databases 1220 may be structured to facilitate storage, retrieval, modification, and deletion of data in conjunction with various data-processing operations. The databases 1220 may consist of a file or sets of files that can be broken down into records, each of which consists of one or more fields. Database information may be retrieved through queries using keywords and sorting commands, in order to rapidly search, rearrange, group, and select the field. The databases 1220 may be any organization of data on a data storage medium, such as one or more servers.

In one embodiment, the databases 1220 are secure web servers and Hypertext Transport Protocol Secure (HTTPS) capable of supporting Transport Layer Security (TLS), which is a protocol used for access to the data. Communications to and from the secure web servers may be secured using Secure Sockets Layer (SSL). Identity verification of a user may be performed using usernames and passwords for all users. Various levels of access rights may be provided to multiple levels of users.

Alternatively, any known communication protocols that enable devices within a computer network to exchange information may be used. Examples of protocols are as follows: IP (Internet Protocol), UDP (User Datagram Protocol), TCP (Transmission Control Protocol), DHCP (Dynamic Host Configuration Protocol), HTTP (Hypertext Transfer Protocol), FTP (File Transfer Protocol), Telnet (Telnet Remote Protocol), SSH (Secure Shell Remote Protocol).

FIG. 13 is an exemplary embodiment of an application 1218a running on the processor 1214. The application 1218a illustratively comprises a receiving module 1302, a probing and comparison module 1304, a cutting tool redressing module 1306, a machining program module 1308, and an output module 1310, used to implement the methods described herein above with reference to FIGS. 2 to 5, FIG. 7, and FIG. 11.

The receiving module 1302 illustratively receives a signal indicating that a workpiece to be machined is in a loading position on the NC machine 1208. The machining program module 1308 then generates a control signal (e.g. NC program) comprising instructions to cause the cutting tool to plunge into the workpiece up to a predetermined partial depth. The control signal may be sent by the output module 1310 to the cutting tool provided on the NC machine 1208. Once the semi-finished surface has been obtained, the probing and comparison module 1304 may then output (e.g. via the output module 1310) a control signal comprising instructions to cause the measuring device (reference 1212 of FIG. 13) to acquire measurements (e.g. dimensions) of the semi-finished surface. The measurements may then be received at the receiving module 1302 and compared at the probing and comparison module 1304 to nominal dimensions, which may be retrieved from the memory 1216 and/or databases 1220. If the probing and comparison module 1304 determines that the measurements are not within tolerance of the nominal measurements (or dimensions), the cutting tool redressing module 1306 may be used for generating and outputting to the dressing tool (reference 1210 in FIG. 12) a control signal comprising instructions to cause redressing of the cutting tool in order to bring the measurements within tolerance. After the cutting tool has been redressed, the machining program module 1308 may generate a signal for causing further machining of the workpiece using the redressed cutting tool. New measurements may then be acquired, as instructed by the probing and comparison module 1304, and correlated to nominal measurements. Once the probing and comparison module 1304 determines that the measurements are within tolerance of the nominal dimensions, the machining program module 1308 may then be used for generating and outputting to the cutting tool a control signal (e.g. NC program) comprising instructions to cause further machining of the workpiece in order to achieve the finished toothed member.

It should be understood that, although the method 100 and system 1200 have been described above with reference to a curvic coupling, other toothed members may apply, as discussed above. Also, it should be understood that the method 100 and system 1200 may apply to other types of engines than the one illustrated in FIG. 1. As discussed above, it should further be understood that the method 100 and system 1200 may apply to any suitable manufacturing process. Using the method 100 and system 1200, toothed members can be machined automatically and precisely on a machine tool with little to no intervention from an operator. Automating the process in turn reduces the time required to manufacture the parts, reduces manufacturing costs, and increases manufacturing quality and repeatability.

The above description is meant to be exemplary only, and one skilled in the art will recognize that changes may be made to the embodiments described without departing from the scope of the invention disclosed. Modifications which fall within the scope of the present invention will be apparent to those skilled in the art, in light of a review of this disclosure, and such modifications are intended to fall within the appended claims.

The invention claimed is:

1. A method for machining from a workpiece a toothed member with a desired tooth pattern, the method comprising:
   machining the workpiece to a predetermined partial depth using a cutting tool to provide a semi-finished tooth pattern created according to a geometry of the cutting tool, the predetermined partial depth less than a full depth of the desired tooth pattern;
   comparing computed parameters of the semi-finished tooth pattern based on dimensions of the semi-finished tooth pattern to nominal parameters of the semi-finished tooth pattern and determining whether the computed parameters are within a predetermined tolerance of the nominal dimensions for the semi-finished tooth pattern at the predetermined partial depth;
   modifying the geometry of the cutting tool to correct deviations of the computed parameters from the tolerance when the computed parameters are not within the predetermined tolerance of the nominal dimensions, and machining the workpiece with the modified cutting tool to bring the dimensions of the semi-finished tooth pattern within the tolerance for the semi-finished tooth pattern at the predetermined partial depth; and machining the workpiece to the full depth to provide the desired tooth pattern when the dimensions of the semi-finished tooth pattern are within the tolerance for the semi-finished tooth pattern at the predetermined partial depth.

2. The method of claim 1, wherein modifying the geometry of the cutting tool comprises adjusting a machining program of the cutting tool and performing a dressing operation on the cutting tool in accordance with the adjusted machining program.

3. The method of claim 1, wherein modifying the geometry of the cutting tool comprises modifying a pressure angle of the cutting tool.

4. The method of claim 1, wherein modifying the geometry of the cutting tool comprises modifying a radial distance between the cutting tool and a dressing tool.

5. The method of claim 1, wherein modifying the geometry of the cutting tool comprises radially shifting the geometry of the cutting tool to adjust a radial offset of the semi-finished tooth pattern.

6. The method of claim 1, further comprising probing the workpiece at a plurality of locations of the semi-finished pattern to obtain the dimensions of the semi-finished tooth pattern.

7. The method of claim 6, wherein probing the workpiece comprises probing one of an upper and a lower face of the semi-finished pattern relative to a reference datum and computing a pitch plane height for the semi-finished tooth pattern.

8. The method of claim 7, wherein machining the workpiece to the full depth comprises computing a distance equal to a difference between the computed pitch plane height and a nominal pitch plane height and plunging the cutting tool into the workpiece by the distance.

9. The method of claim 1, further comprising computing a tooth depth, a tooth width, and a pressure angle for the semi-finished tooth pattern as the computed parameters.

10. The method of claim 1, wherein the nominal dimensions are obtained from a virtual tooth pattern.

11. The method of claim 10, wherein the virtual tooth pattern is obtained by scanning surfaces of a master gauge, the virtual tooth pattern complementary to the desired tooth pattern.

* * * * *